(12) United States Patent
Diorio

(10) Patent No.: US 8,044,774 B1
(45) Date of Patent: Oct. 25, 2011

(54) RFID TAG CHIPS AND TAGS ABLE TO BE PARTIALLY KILLED AND METHODS

(75) Inventor: Christopher J. Diorio, Shoreline, WA (US)

(73) Assignee: Impinj, Inc., Seattle, WA (US)

( * ) Notice: Subject to any disclaimer, the term of this patent is extended or adjusted under 35 U.S.C. 154(b) by 1079 days.

(21) Appl. No.: 11/852,439

(22) Filed: Sep. 10, 2007

Related U.S. Application Data

(60) Provisional application No. 60/853,994, filed on Oct. 24, 2006.

(51) Int. Cl.
    *H04Q 5/22* (2006.01)
(52) U.S. Cl. .............. 340/10.41; 340/10.51; 340/5.54; 340/10.1; 340/5.74
(58) Field of Classification Search .............. 340/572.1, 340/572.3, 10.51, 10.41, 5.54, 5.61, 5.74, 340/10.1
    See application file for complete search history.

(56) References Cited

U.S. PATENT DOCUMENTS

| | | | | |
|---|---|---|---|---|
| 4,506,329 A * | 3/1985 | Duwel et al. | ................... | 705/410 |
| 5,175,837 A * | 12/1992 | Arnold et al. | ................... | 711/152 |
| 5,394,367 A * | 2/1995 | Downs et al. | .................. | 365/195 |
| 5,467,081 A * | 11/1995 | Drews et al. | ................... | 340/5.22 |
| 5,513,136 A * | 4/1996 | Fandrich et al. | ......... | 365/185.04 |
| 5,535,164 A * | 7/1996 | Adams et al. | ................. | 365/201 |
| 5,809,553 A * | 9/1998 | Choi et al. | .................... | 711/170 |
| 5,874,896 A * | 2/1999 | Lowe et al. | ................. | 340/572.1 |
| 6,031,757 A * | 2/2000 | Chuang et al. | ............ | 365/185.04 |
| 7,007,145 B2 * | 2/2006 | Schrodinger et al. | ......... | 711/164 |
| 7,108,183 B1 * | 9/2006 | Cox, Jr. | ..................... | 235/462.01 |
| 7,167,090 B1 * | 1/2007 | Mandal et al. | ............ | 340/538.14 |
| 7,321,300 B2 * | 1/2008 | Friedrich et al. | ......... | 340/539.11 |
| 7,742,348 B2 * | 6/2010 | Schuessler | ..................... | 365/192 |
| 7,872,582 B1 * | 1/2011 | Diorio | ........................ | 340/572.1 |
| 2004/0246103 A1 * | 12/2004 | Zukowski | .................. | 340/10.41 |
| 2005/0073197 A1 * | 4/2005 | Matsubara et al. | .......... | 307/10.5 |
| 2005/0130389 A1 | 6/2005 | Yamazaki et al. | | |
| 2005/0270141 A1 * | 12/2005 | Dalglish | ..................... | 340/10.4 |
| 2007/0008070 A1 * | 1/2007 | Friedrich | .................... | 340/10.1 |
| 2007/0176756 A1 * | 8/2007 | Friedrich | .................. | 340/10.51 |
| 2007/0199988 A1 * | 8/2007 | Labgold et al. | ............... | 235/385 |
| 2007/0273481 A1 * | 11/2007 | Soleimani | ..................... | 340/10.1 |
| 2007/0276985 A1 * | 11/2007 | Schuessler | ..................... | 711/100 |
| 2008/0001724 A1 * | 1/2008 | Soleimani et al. | ......... | 340/10.51 |
| 2008/0001725 A1 * | 1/2008 | White et al. | ................. | 340/10.51 |
| 2008/0012685 A1 * | 1/2008 | Friedrich et al. | .............. | 340/5.25 |
| 2008/0034183 A1 * | 2/2008 | Drago et al. | ................. | 711/219 |
| 2008/0080214 A1 | 4/2008 | Umeda et al. | | |
| 2008/0129506 A1 * | 6/2008 | Schuessler | ................. | 340/572.1 |

OTHER PUBLICATIONS

EPCglobal, Inc Specification of RFID air interface—EPC Radio Frequency Identity Protocol Class-1 Generation-2 UHF RFID Protocol for Communications at 860MHz-960MHz Verson 1.1.0 Dec. 17, 2005.*

"Declaration of Stacy L. Jones authenticating attached website materials", www.autoid.org/SC31/sc_31_wg4_sg3.htm Sep. 1, 2006.

(Continued)

*Primary Examiner* — Hoi Lau

(74) *Attorney, Agent, or Firm* — Turk IP Law, LLC

(57) ABSTRACT

RFID tag circuits, tags, and methods are provided for receiving a partial-kill command. In response to receiving such a command, the tag circuit or tag becomes partially killed. This means that one or more but not all of its memory functions become disabled.

43 Claims, 19 Drawing Sheets

OTHER PUBLICATIONS

Non-Final Office Action U.S. Appl. No. 11/877,054 mailed Oct. 2, 2009.
Non-Final Office Action U.S. Appl. No. 11/877,054 mailed Mar. 9, 2010.
Non-Final Office Action U.S. Appl. No. 11/877,774 mailed Nov. 18, 2009.
Non-Final Office Action U.S. Appl. No. 11/872,774 mailed May 14, 2010.
EPCglobal, Inc "*Specification of RFID Air Interface—EPC Radio-Frequency Identity Protocols Class-1 Generation-2 UHF RFID Protocol for Communications at 860 MHz-960 MHz, Version 1.1.0.*" (a.k.a. "The Gen 2 Spec") EPCglobal Inc. Dec. 17, 2005.
EPCglobal, Inc "*Specification of RFID Air Interface—EPC Radio-Frequency Identity Protocols Class-1 Generation-2 UHF RFID Protocol for Communications at 860 MHz-960 MHz, Version 1.0.8.*" (a.k.a. "The Gen 2 Spec") EPCglobal Inc. Dec. 14, 2004.
"Specification for RFID Air Interface: EPCTM Radio-Frequency Identity Protocols Class-1 Generation-2 UHF RFID Protocols for Communications at 860 MHz-960 MHz Version 1.2.0. 2004-2008", EPCglobal Inc. Oct. 23, 2008, 1-108.
Specification for RFID Air Interface: EPC™ Radio-Frequency Identity Protocols Class-1 Generation-2 UHF RFID Protocols for Communications at 860 MHz-960 MHz Version 1.2.0. 2004-2008 EPCglobal Inc. Oct. 23, 2008: 1-108.

* cited by examiner

SIGNAL PATH DURING R→T

SIGNAL PATH DURING T→R

*MEMORY WITH DEDICATED MEMORY LOCK BITS*

EXAMPLE TAG STATE DIAGRAM

*EXAMPLE TAG STATE DIAGRAM*

EXAMPLE TAG STATE DIAGRAM

RFID TAG CHIPS AND TAGS ABLE TO BE PARTIALLY KILLED AND METHODS

RELATED APPLICATIONS

This utility patent application claims the benefit of U.S. Provisional Application Ser. No. 60/853,994 filed on Oct. 24, 2006, which is hereby claimed under 35 U.S.C. §119(e). The provisional application is incorporated herein by reference.

BACKGROUND

Radio Frequency IDentification (RFID) systems typically include RFID tags and RFID readers (the latter are also known as RFID reader/writers or RFID interrogators). RFID systems can be used in many ways for locating and identifying objects to which the tags are attached. RFID systems are particularly useful in product-related and service-related industries for tracking large numbers of objects being processed, inventoried, or handled. In such cases, an RFID tag is usually attached to an individual item, or to its package.

In principle, RFID techniques entail using an RFID reader to interrogate one or more RFID tags. The reader transmitting a Radio Frequency (RF) wave performs the interrogation. A tag that senses the interrogating RF wave responds by transmitting back another RF wave. The tag generates the transmitted back RF wave either originally, or by reflecting back a portion of the interrogating RF wave in a process known as backscatter. Backscatter may take place in a number of ways.

The reflected-back RF wave may further encode data stored internally in the tag, such as a number. The response is demodulated and decoded by the reader, which thereby identifies, counts, or otherwise interacts with the associated item. The decoded data can denote a serial number, a price, a date, a destination, other attribute(s), any combination of attributes, and so on.

An RFID tag typically includes an antenna system, a power management section, a radio section, and frequently a logical section, a memory, or both. In earlier RFID tags, the power management section included an energy storage device, such as a battery. RFID tags with an energy storage device are known as active or semi-active tags. Advances in semiconductor technology have miniaturized the electronics so much that an RFID tag can be powered solely by the RF signal it receives. Such RFID tags do not include an energy storage device, and are called passive tags.

A tag may have multiple functionalities, some of which are associated with the information stored in different portions of its memory. It may be possible to disable some of those functionalities using a "Kill" command. For example, the user memory portion of the tag memory may be disabled at a Point-Of-Sale (POS) terminal. Kill operations are usually permanent and irreversible, even though it may be desirable to revive the disabled functionality or functionalities at a later date.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments are directed to RFID tag circuits, tags, and methods for receiving a partial-kill command. In response to receiving such a command, the tag circuit or tag becomes partially killed. This means that one or more but not all of its memory functions become disabled.

This and other features and advantages of the invention will be better understood in view of the Detailed Description and the Drawings, in which:

BRIEF DESCRIPTION OF THE DRAWINGS

Non-limiting and non-exhaustive embodiments are described with reference to the following drawings.

DETAILED DESCRIPTION

Figure 1:
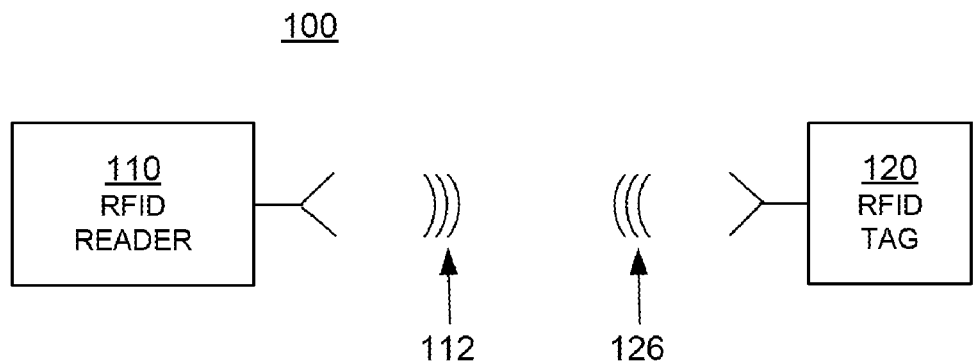
FIG. 1 illustrates a typical RFID system with an RFID reader and an RFID tag.

Various embodiments will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed subject matter.

Throughout the specification and claims, the following terms take at least the meanings explicitly associated herein, unless the context clearly dictates otherwise. The meanings identified below are not intended to limit the terms, but merely provide illustrative examples for the terms. The meaning of "a," "an," and "the" includes plural reference, the meaning of "in" includes "in" and "on." The term "connected" means a direct electrical connection between the items connected, without any intermediate devices. The term "coupled" means either a direct electrical connection between the items connected or an indirect connection through one or more passive or active intermediary devices. The term "circuit" means either a single component or a multiplicity of components, either active and/or passive, that are coupled together to provide a desired function. The term "signal" means at least one current, voltage, charge, temperature, data, or other measurable quantity. The terms "RFID reader" and "RFID tag" are used interchangeably with the terms "reader" and "tag", respectively, throughout the text and claims.

All of the circuits described in this document may be implemented as circuits in the traditional sense, such as with integrated circuits etc. All or some of them can also be implemented equivalently by other ways known in the art, such as by using one or more processors, Digital Signal Processing (DSP), a Field-Programmable Gate Array (FPGA), etc.

FIG. 1 is a diagram of an example RFID system including an RFID reader communicating with an RFID tag in its field of view. An RFID reader 110 transmits an interrogating Radio Frequency (RF) wave 112. RFID tag 120 in the vicinity of RFID reader 110 may sense interrogating RF wave 112, and generate wave 126 in response. RFID reader 110 senses and interprets wave 126.

Reader 110 and tag 120 exchange data via wave 112 and wave 126. In a session of such an exchange, each encodes, modulates, and transmits data to the other, and each receives, demodulates, and decodes data from the other. The data is modulated onto, and decoded from, RF waveforms.

Encoding the data in waveforms can be performed in a number of different ways. For example, protocols are devised to communicate in terms of symbols, also called RFID symbols. A symbol for communicating can be a delimiter, a calibration symbol, and so on. Further symbols can be implemented for ultimately exchanging binary data, such as "0" and "1", if that is desired. In turn, when the waveforms are processed internally by reader 110 and tag 120, they can be equivalently considered and treated as numbers having corresponding values, and so on.

Tag 120 can be a passive tag or an active or semi-active tag, i.e. having its own power source. Where tag 120 is a passive tag, it is powered from wave 112.

Figure 2:
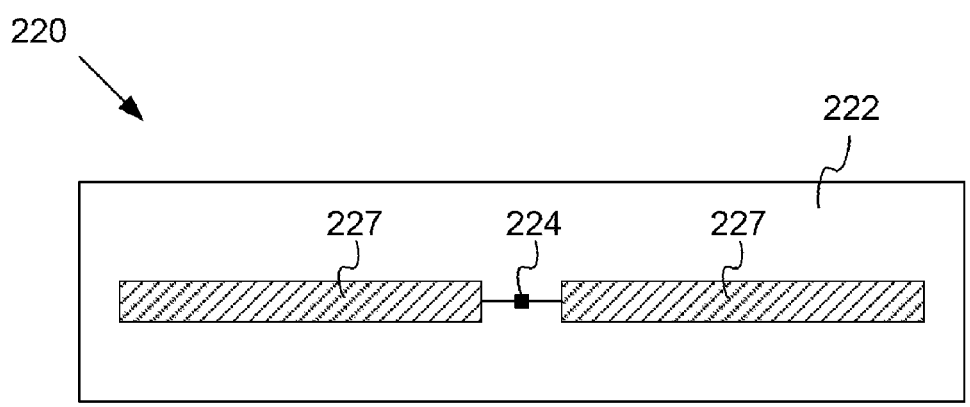
FIG. 2 is a diagram of an RFID tag such as the RFID tag shown in FIG. 1.

FIG. 2 is a diagram of an RFID tag 220, which can be the same as tag 120 of FIG. 1. Tag 220 is implemented as a passive tag, meaning it does not have its own power source. Much of what is described in this document, however, applies also to active tags.

Tag 220 is formed on a substantially planar inlay 222, which can be made in many ways known in the art. Tag 220 includes an electrical circuit, which is preferably implemented in an integrated circuit (IC) 224. IC 224 is arranged on inlay 222.

Tag 220 also includes an antenna for exchanging wireless signals with its environment. The antenna is usually flat and attached to inlay 222. IC 224 is electrically coupled to the antenna via suitable antenna ports (not shown in FIG. 2).

The antenna may be made in a number of ways, as is well known in the art. In the example of FIG. 2, the antenna is made from two distinct antenna segments 227, which are shown here forming a dipole. Many other embodiments are possible, using any number of antenna segments.

In some embodiments, an antenna can be made with even a single segment. Different places of the segment can be coupled to one or more of the antenna ports of IC 224. For example, the antenna can form a single loop, with its ends coupled to the ports. When the single segment has more complex shapes it should be remembered that, at the frequencies of RFID wireless communication, even a single segment could behave like multiple segments.

In operation, a signal is received by the antenna, and communicated to IC 224. IC 224 both harvests power, and responds if appropriate, based on the incoming signal and its internal state. In order to respond by replying, IC 224 modulates the reflectance of the antenna, which generates the backscatter from a wave transmitted by the reader. Coupling together and uncoupling the antenna ports of IC 224 can modulate the reflectance, as can a variety of other means.

In the embodiment of FIG. 2, antenna segments 227 are separate from IC 224. In other embodiments, antenna segments may alternately be formed on IC 224, and so on.

The components of the RFID system of FIG. 1 may communicate with each other in any number of modes. One such mode is called full duplex. Another such mode is called half-duplex, and is described below.

Figure 3:
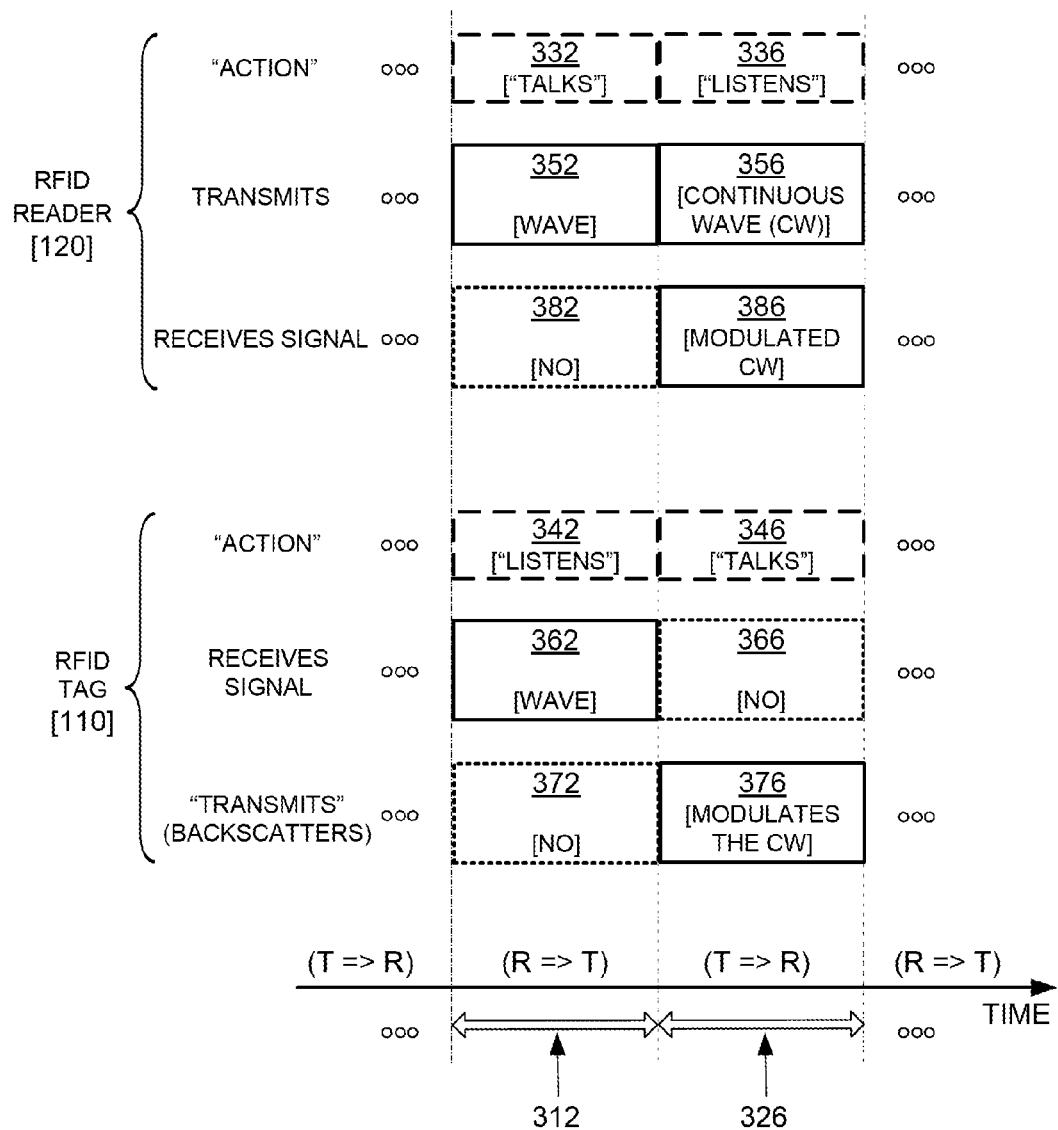
FIG. 3 is a conceptual diagram for explaining a half-duplex mode of communication between the components of the RFID system of FIG. 1.

FIG. 3 is a conceptual diagram 300 for explaining the half-duplex mode of communication between the components of the RFID system of FIG. 1, especially when tag 120 is implemented as passive tag 220 of FIG. 2. The explanation is made with reference to a TIME axis, and also to a human metaphor of "talking" and "listening". The actual technical implementations for "talking" and "listening" are now described.

RFID reader 110 and RFID tag 120 talk and listen to each other by taking turns. As seen on axis TIME, when reader 110 talks to tag 120 the communication session is designated as "R→T", and when tag 120 talks to reader 110 the communication session is designated as "T→R". Along the TIME axis, a sample R→T communication session occurs during a time interval 312, and a following sample T→R communication session occurs during a time interval 326. Of course interval 312 is typically of a different duration than interval 326—here the durations are shown approximately equal only for purposes of illustration.

According to blocks 332 and 336, RFID reader 110 talks during interval 312, and listens during interval 326. According to blocks 342 and 346, RFID tag 120 listens while reader 110 talks (during interval 312), and talks while reader 110 listens (during interval 326).

In terms of actual technical behavior, during interval 312, reader 110 talks to tag 120 as follows. According to block 352, reader 110 transmits wave 112, which was first described in FIG. 1. At the same time, according to block 362, tag 120 receives wave 112 and processes it, to extract data and so on. Meanwhile, according to block 372, tag 120 does not backscatter with its antenna, and according to block 382, reader 110 has no wave to receive from tag 120.

During interval 326, tag 120 talks to reader 110 as follows. According to block 356, reader 110 transmits a Continuous Wave (CW), which can be thought of as a carrier signal that ideally encodes no information. As discussed before, this carrier signal serves both to be harvested by tag 120 for its own internal power needs, and also as a wave that tag 120 can backscatter. Indeed, during interval 326, according to block 366, tag 120 does not receive a signal for processing. Instead, according to block 376, tag 120 modulates the CW emitted according to block 356, so as to generate backscatter wave 126. Concurrently, according to block 386, reader 110 receives backscatter wave 126 and processes it.

Figure 4:
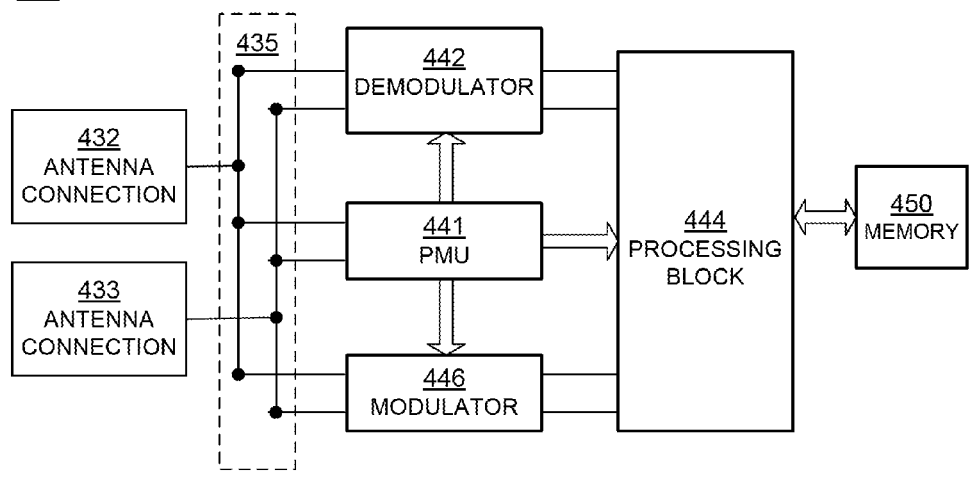
FIG. 4 is a block diagram illustrating one embodiment of an electrical circuit that may be employed in an RFID tag such as the RFID tag of FIG. 1.

FIG. 4 is a block diagram of an electrical circuit 430. Circuit 430 may be formed in an IC of an RFID tag, such as IC 224 of FIG. 2. Circuit 430 has a number of main components that are described in this document. Circuit 430 may have a number of additional components from what is shown and described, or different components, depending on the exact implementation.

Circuit 430 includes at least two antenna connections 432, 433, which are suitable for coupling to one or more antenna segments (not shown in FIG. 4). Antenna connections 432, 433 may be made in any suitable way, such as pads and so on. In a number of embodiments more than two antenna connections are used, especially in embodiments where more antenna segments are used.

Circuit 430 includes a section 435. Section 435 may be implemented as shown, for example as a group of nodes for proper routing of signals. In some embodiments, section 435 may be implemented otherwise, for example to include a receive/transmit switch that can route a signal, and so on.

Circuit 430 also includes a Power Management Unit (PMU) 441. PMU 441 may be implemented in any way known in the art, for harvesting raw RF power received via antenna connections 432, 433. In some embodiments, PMU 441 includes at least one rectifier, and so on.

In operation, an RF wave received via antenna connections 432, 433 is received by PMU 441, which in turn generates power for components of circuit 430. This is true for either or both R→T and T→R sessions, whether or not the received RF wave is modulated.

Circuit 430 additionally includes a demodulator 442. Demodulator 442 demodulates an RF signal received via antenna connections 432, 433. Demodulator 442 may be implemented in any way known in the art, for example including an attenuator stage, amplifier stage, and so on.

Circuit 430 further includes a processing block 444. Processing block 444 receives the demodulated signal from demodulator 442, and may perform operations. In addition, it may generate an output signal for transmission.

Processing block 444 may be implemented in any way known in the art. For example, processing block 444 may include a number of components, such as a processor, a memory, a decoder, an encoder, and so on.

Circuit 430 additionally includes a modulator 446. Modulator 446 modulates an output signal generated by processing block 444. The modulated signal is transmitted by driving antenna connections 432, 433, and therefore driving the load presented by the coupled antenna segment or segments. Modulator 446 may be implemented in any way known in the art, for example including a driver stage, amplifier stage, and so on.

In one embodiment, demodulator 442 and modulator 446 may be combined in a single transceiver circuit. In another embodiment, modulator 446 may include a backscatter transmitter or an active transmitter. In yet other embodiments, demodulator 442 and modulator 446 are part of processing block 444. Circuit 430 additionally includes a memory 450, which stores information. Memory 450 is preferably implemented as a Nonvolatile Memory (NVM), which means that its stored information is retained even when circuit 430 does not have power, as is frequently the case for a passive RFID tag.

It will be recognized at this juncture that the shown components of circuit 430 can be those of a circuit of an RFID tag according to the invention, with or without needing PMU 441. Indeed, an RFID tag can be powered differently, such as from a wall outlet, a battery, and so on. Additionally, when circuit 430 is configured as a reader, processing block 444 may have additional Inputs/Outputs (I/O) to a terminal, network, or other such devices or connections.

In terms of processing a signal, circuit 430 operates differently during a R→T session and a T→R session. The different operations are described below, in this case with circuit 430 representing an RFID tag.

Figure 5A:
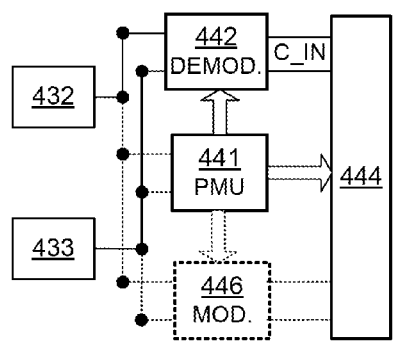
FIGS. 5A and 5B illustrate two versions of the electrical circuit of FIG. 4 emphasizing signal flow in receive and transmit operational modes of the RFID tag, respectively.

FIG. 5A shows version 530-A of components of circuit 430 of FIG. 4, further modified to emphasize a signal operation during a R→T session (receive mode of operation) during time interval 312 of FIG. 3. An RF wave is received from antenna connections 432, 433; a signal is demodulated from demodulator 442, and then input to processing block 444 as C_IN. In one embodiment according to the present invention, C_IN may include a received stream of symbols.

Version 530-A shows as relatively obscured those components that do not play a part in processing a signal during a R→T session. Indeed, PMU 441 may be active, but only in converting raw RF power. And modulator 446 generally does not transmit during a R→T session. Modulator 446 typically does not interact with the received RF wave significantly, either because switching action in section 435 of FIG. 4 decouples the modulator 446 from the RF wave, or by designing modulator 446 to have a suitable impedance, and so on.

While modulator 446 is typically inactive during a R→T session, it need not always be the case. For example, during a R→T session, modulator 446 could be active in other ways. For example, it could be adjusting its own parameters for operation in a future session.

Figure 5B:
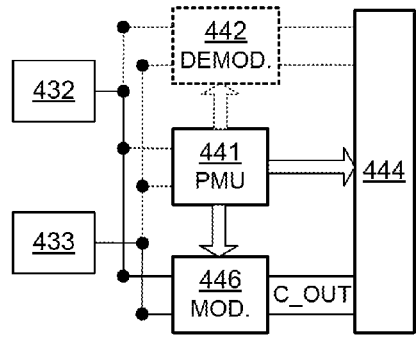

FIG. 5B shows version 530-B of components of circuit 430 of FIG. 4, further modified to emphasize a signal operation during a T→R session during time interval 326 of FIG. 3. A signal is output from processing block 444 as C_OUT. In one embodiment according to the present invention, C_OUT may include a transmission stream of symbols. C_OUT is then modulated by modulator 446, and output as an RF wave via antenna connections 432, 433.

Version 530-B shows as relatively obscured those components that do not play a part in processing a signal during a T→R session. Indeed, PMU 441 may be active, but only in converting raw RF power. And demodulator 442 generally does not receive during a T→R session. Demodulator 442 typically does not interact with the transmitted RF wave, either because switching action in section 435 decouples the demodulator 442 from the RF wave, or by designing demodulator 442 to have a suitable impedance, and so on.

While demodulator 442 is typically inactive during a T→R session, it need not be always the case. For example, during a T→R session, demodulator 442 could be active in other ways. For example, it could be adjusting its own parameters for operation in a future session.

Figure 6A:
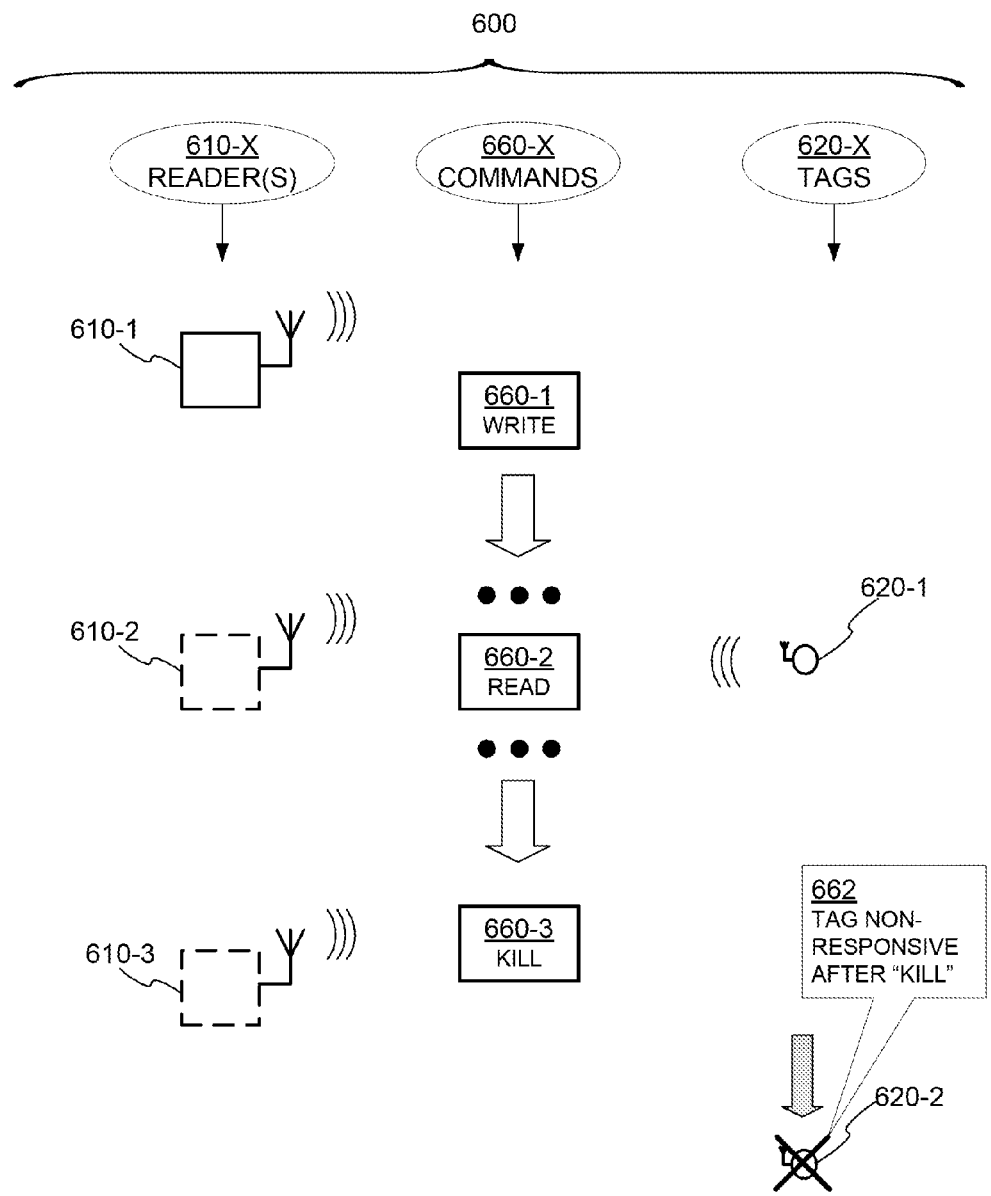
FIG. 6A is a conceptual diagram illustrating different commands transmitted by one or more readers including a "Kill" command rendering a tag unusable.

FIG. 6A is a conceptual diagram illustrating a few of the possible commands that can be received by a tag, e.g. as transmitted by one or more readers. One such command is a "Kill" command, which renders a tag permanently non-responsive to any further commands by a reader.

As shown in diagram 600, a reader 610-1 may transmit a "Write" command (660-1) to tag 620-1 causing the tag to store information in its memory. Tag 620-1 may be written multiple times, including after intervening commands such as a "Read".

At a later time point, reader 610-1 or another reader (610-2) may transmit a "Read" command (660-2) to read tag 620-1. Tag 620-1 may be read multiple times.

At one point during the operations, reader 610-1 or yet another reader (610-3) may transmit a "Kill" command to tag 620-1. Upon receiving the "Kill" command, tag 660-1 performs a series of operations that typically renders tag 660-1 nonresponsive to further commands, according to comment 662. Often such a tag is then called a killed tag.

Figure 6B:
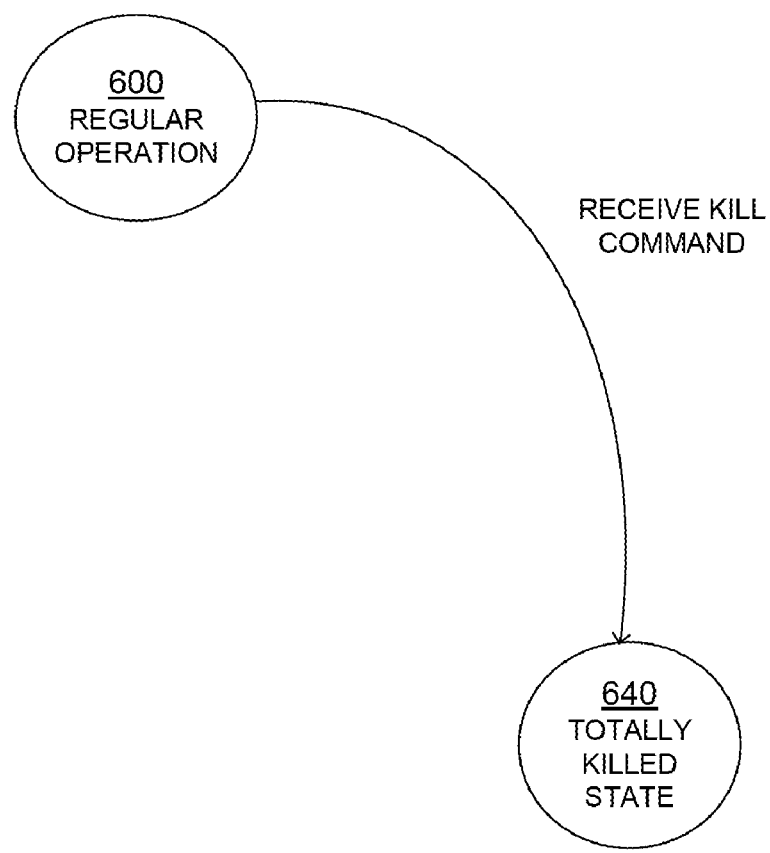
FIG. 6B is an example tag state diagram illustrating transition of a tag from an operational state to a totally killed state upon receiving a "Kill" command.

FIG. 6B is an example tag state diagram illustrating the transition of a tag from an operational state to a killed state upon receiving a "Kill" command.

As shown in tag state diagram 601, a tag in a regular operational state 600, upon receiving a "Kill" command, transitions to totally killed state 640 in which the tag becomes no longer responsive to subsequent commands. In the prior art, state 640 was known as killed stated; the adverb "totally" is added in this disclosure to differentiate from embodiments of the invention.

The invention also includes methods. Some are methods of operation of an RFID tag or an RFID tag circuit. Others are methods for controlling an RFID tag or RFID tag circuit. These methods can be implemented in any number of ways, including using the structures described in this document. One such way is by machine operations, by devices of the type described in this document.

Methods are now described more particularly according to embodiments.

Figure 7:
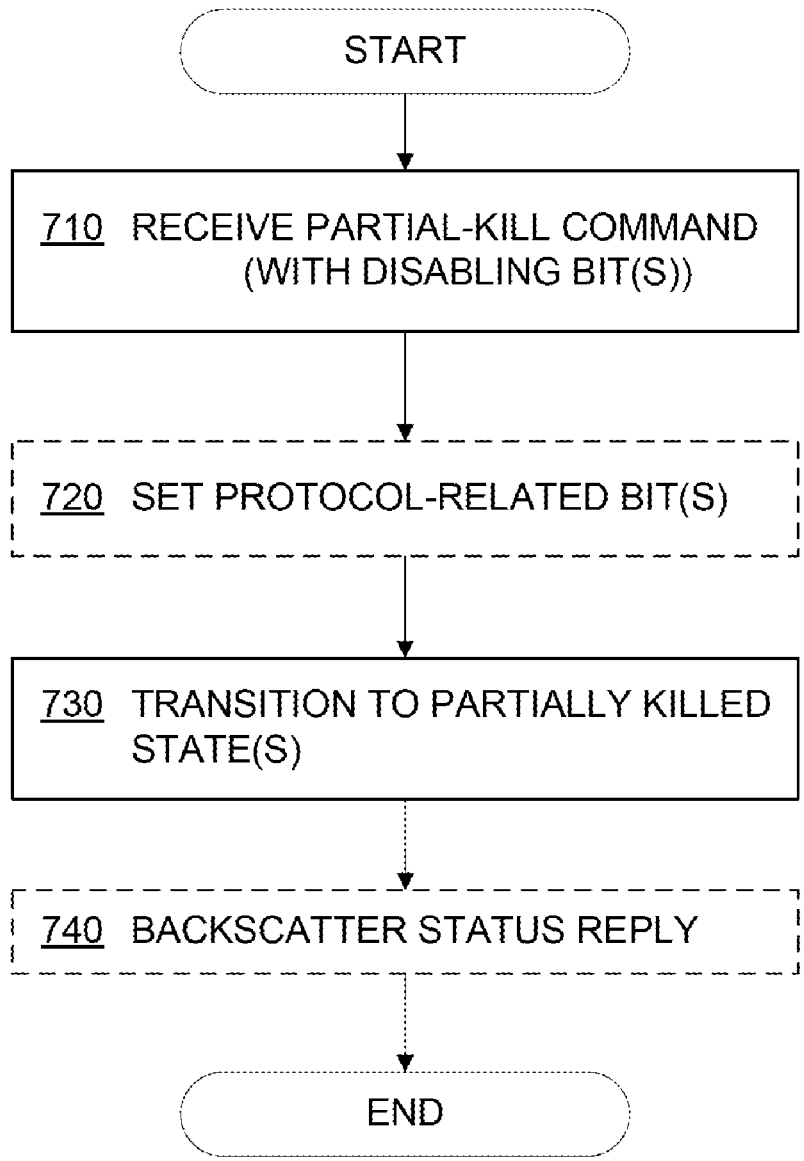
FIG. 7 is a flowchart of an RFID tag becoming partially killed as per embodiments of the invention.

FIG. 7 is a flowchart 700 of an RFID tag or chip becoming partially killed according to embodiments of the invention. The tag or chip starts by having a memory, and a memory function associated with at least a portion of the memory. In other words, it can employ the memory function in response to receiving an initial memory command.

In addition, the tag or chip is able to backscatter a particular operating reply in response to an operating request. Such an operating request can be, for example, a request for a random number, which is called Req_RN in the Gen2 Specification. The appropriate reply is a random number backscattered from the tag.

According to operation 710, the tag receives from a reader a first command. The first command can be any command suitable for being designed as a partial-kill command. In some embodiments it is a standalone partial-kill custom command, without a payload. In other embodiments, the first command includes a command code and a command payload that has one or more disabling bits. These disabling bits indicate that the first command is a partial-kill command. The command code can be any command suitable for creating a partial-kill command, such as that of a "Kill" command, a protocol command, a proprietary command, a custom command, etc.

According to an optional next operation 720, the tag sets one or more corresponding protocol-related bits in response to the received first command. Where disabling bits have been implemented, the one or more corresponding protocol-related bits can be set according to the received disabling bits. In fact, the protocol-related bits can be the same as the disabling bits, although that is not necessary.

The protocol-related bit(s) can be set anywhere. It is preferred that they be set in the memory, as will be described below.

According to a next operation 730, the tag transitions to a partially killed state, in response to receiving the first command of operation 710. In other words, the tag transitions to a state where one or more (but not all) of its memory functions are disabled. The partial-kill command means, therefore, that the tag is not to be totally killed in the traditional sense, but only to be partially killed. Therefore, the tag does not lose all ability to backscatter any reply, but still retains at least some functionality. For example, the tag or chip may still be above to backscatter an appropriate operating reply to an operating request, such as for a random number as described above. However, the tag becoming partially killed means that there can be some operating requests for which the appropriate operating reply will no longer be backscattered, due to the disabling.

In the embodiments where the first command includes one or more disabling bits, disabling can be performed according to the disabling bits. In fact, the disabling bits can dictate which one(s) of the memory functionalities are to be disabled.

In the embodiments where protocol-related bits are set in response to the received first command, these protocol-related bits can further be set responsive to the disabling bits.

In a preferred embodiment, a protocol-related bit is set, or not, by performing a logic OR operation between a value of a currently stored protocol-related bit, and a value of a corresponding received disabling bit. So, the protocol-related bit can start with a value of 0, which can be defined as not set. As long as the disabling bits are 0, it remains with the value of 0. Once a disabling bit with a value of 1 is received, the protocol-related bit becomes 1 by the logic OR operation, which means that the protocol-related bit becomes set. Subsequent disabling bits will not change it, which can make for an irreversible operation.

In a number of embodiments, the memory function is disabled by adjusting a first lock bit. For example, the lock bit is adjusted responsive to setting the associated protocol-related bit.

According to a next optional operation 740, the tag backscatters a status reply. The status reply has been generated also from the first protocol-related bit, to indicate that the first memory function has been disabled.

The status reply can be implemented in any number of ways. For example, the status reply can be backscattered in response to receiving the first command. This way the tag can confirm to the reader that it performed the commanded operation, as a "DONE" response.

For another example, the status reply can be backscattered in response to a subsequent command by a reader. This way the tag can inform a different reader that it has been partially killed.

The disabling can be indicated in any number of ways. For example, the status reply can indicate a value of the set first protocol-related bit, directly or not, or the original disabling bit, etc.

It will be understood that the operations included in process 700 are for illustration purposes only. The invention may be further practiced by similar processes with fewer or with additional steps, as well as in a different order of operations, using the principles described herein.

Figure 8:
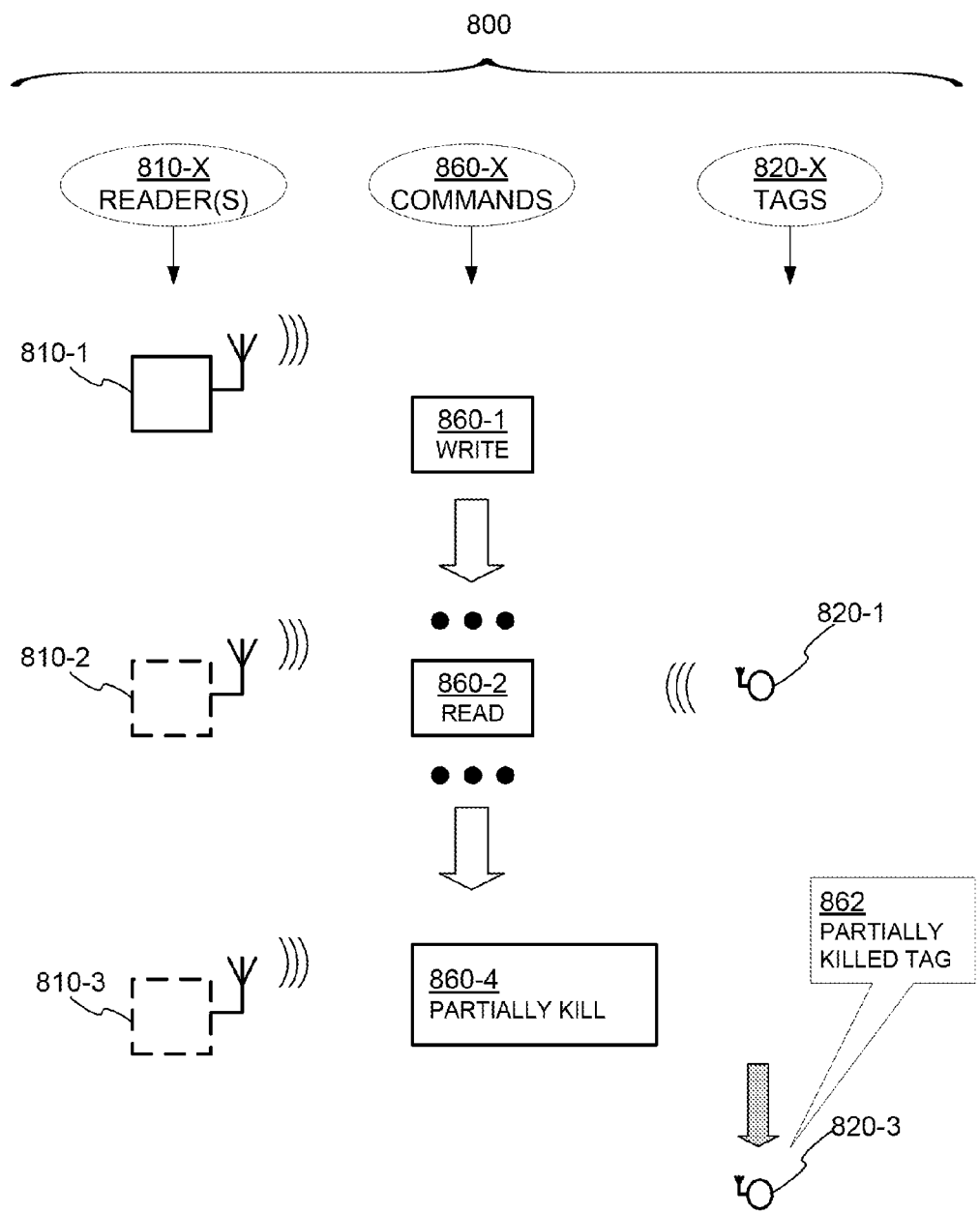
FIG. 8 is a conceptual diagram illustrating different commands transmitted by one or more readers and a "Partial Kill" command causing a tag to become partially killed as per FIG. 7.

FIG. 8 is a conceptual diagram illustrating different commands transmitted by one or more readers and a partial-kill command causing a tag to become partially killed as per FIG. 7.

Similar to the operations described in FIG. 6A, a reader 810-1 may cause tag 820-1 to store information in its memory by transmitting "Write" command 860-1. The same reader or another reader (810-2) may read the tag by transmitting "Read" command 860-2.

At some point in the tag's life cycle, a reader (e.g. 810-3) may transmit a partial-kill command 860-4 to tag 820-1. This causes the tag to disable one or more of its functionalities (partially disabled tag 820-3, according to comment 862).

A survey of a tag memory is now given, so that partially killing a tag may be better understood.

Figure 9A:
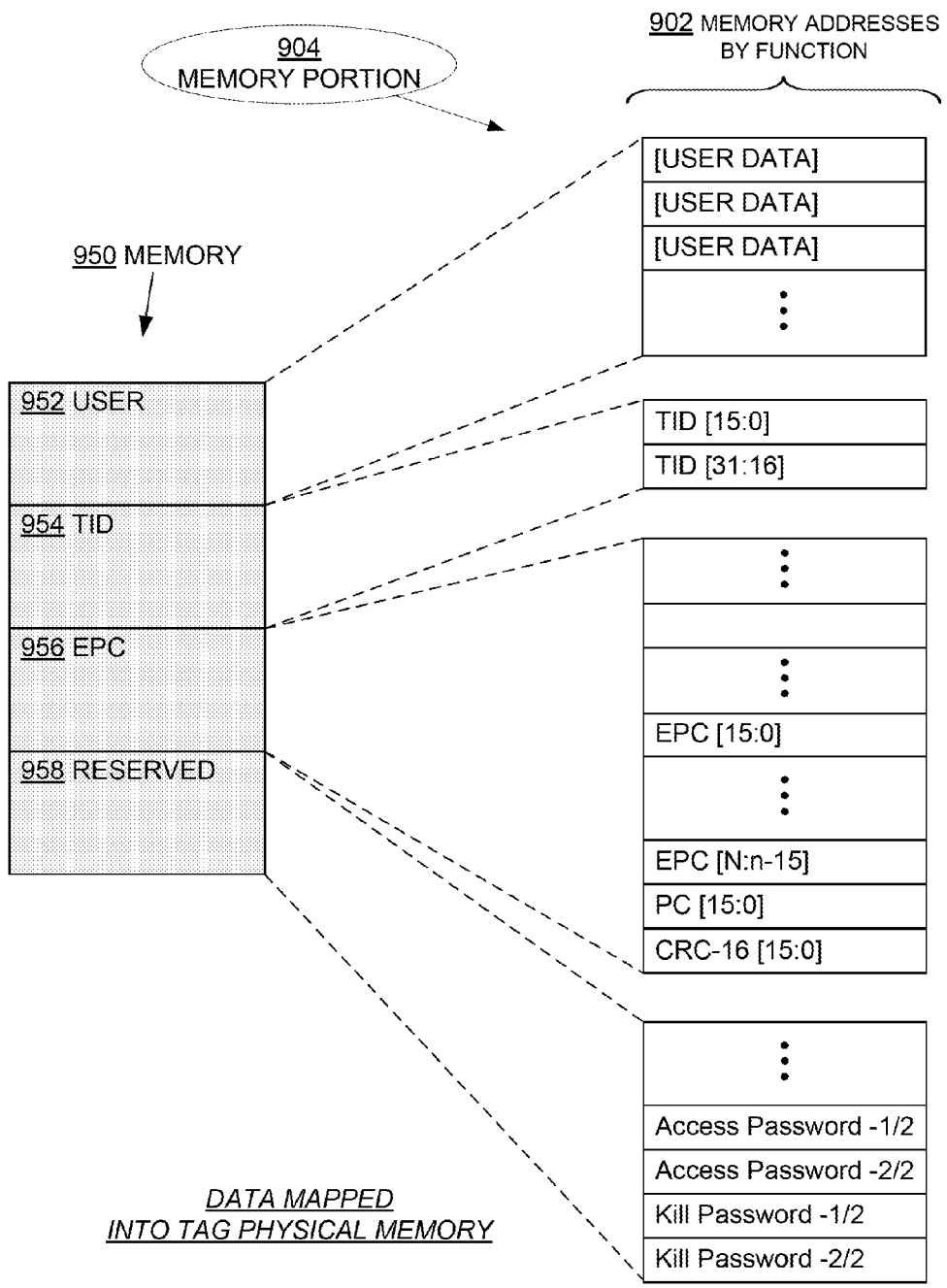
FIG. 9A is a diagram illustrating how a tag physical memory such as the memory shown in FIG. 4 can be partitioned and organized for data to be mapped into it, also in compliance with the Gen2 Specification.

FIG. 9A is a diagram illustrating how a tag physical memory such as the memory shown in FIG. 4 can be partitioned and organized for data to be mapped into it, also in compliance with the Gen2 Specification.

Tag memory 950 is partitioned into different portions. The data stored in memory 950 may include identification information associated with the tag, information associated with an item the tag is attached to, communication parameters such as a password, externally delivered data, and the like. Data may be stored in portions of the memory such as memory portion 904 during a production stage, or during an operation by processing block 444 of FIG. 4. Processing block 444 may access memory 950 to store or retrieve one or more of a received command, password, production data, and externally delivered data. Processing block 444 may also access memory 950 to change its contents based on a command received from a reader.

As mentioned above, tag memory 950 may be partitioned into user-specific portion 952, tag-identification (TID) portion 954, object-identification portion (EPC) 956, and reserved portion 958. In other embodiments, memory 950 may be partitioned in other ways with fewer or more portions, or not partitioned at all.

User-specific portion 952 may be employed to store user-specified information such as a date code, a store location, and sensor data if the tag is associated with a sensor whose data is mapped to user memory. Mapping of sensor data is discussed in commonly owned U.S. patent application Ser. No. 11/217,616, published on 2006 Aug. 24 as document 2006/0187031A1.

Information stored in user memory 952 may be used in tag operations.

Tag-identification portion (TID) 954 may be employed to store information associated with a tag identifier, and may store other data as well.

Object identification portion (EPC) memory 956 can be arranged to store, as convenient, a protocol control (PC) parameter, an EPC code, and/or a CRC16 (cyclic redundancy check) as shown in memory addresses 952.

Reserved memory portion 958 may be used to store system parameters such as passwords. Two such example parameters, an access command password and a kill command password, are illustrated in FIG. 9A.

Figure 9B:
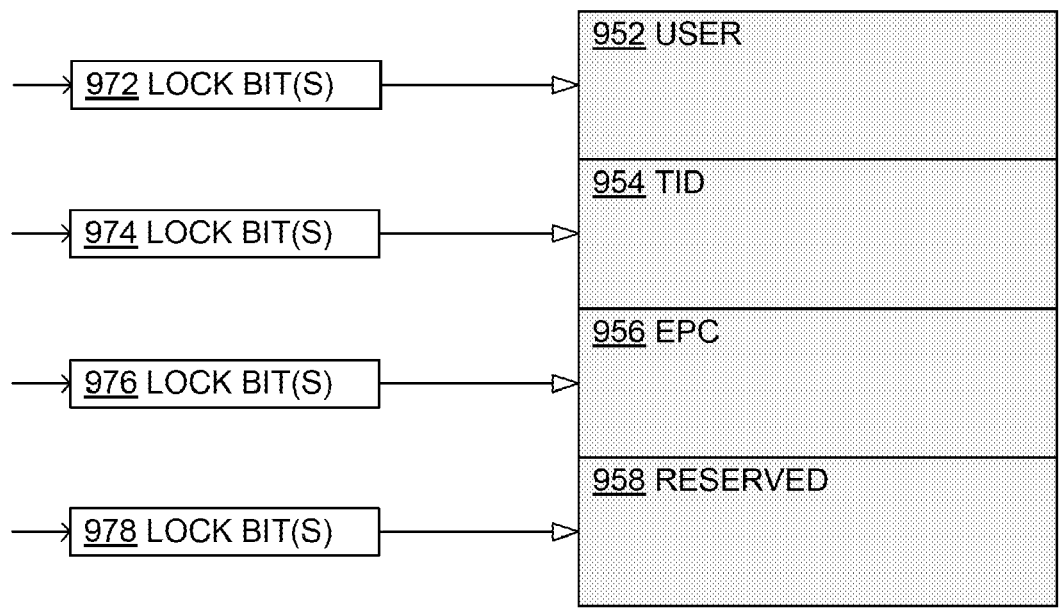
FIG. 9B is a diagram illustrating how lock bits can be used to control access to the partitioned and organized memory of FIG. 9A, also in compliance with the Gen2 Specification.

FIG. 9B is a diagram illustrating how lock bits can be used to control access to the partitioned and organized memory of FIG. 9A, also in compliance with the Gen2 Specification.

A reader may control access to particular portions of a tag's memory by transmitting commands that can temporarily or permanently block access to those portions such that the contents of the memory portion cannot be changed (or even read) by subsequent commands.

For example, a retail sales organization may desire to permanently lock some information stored in their tags, such as recycling information stored in User memory portion 952, so that the product to which the tag is attached can be recycled at the end of the product's life. On the other hand certain memory portions may be temporarily blocked such that they can be made accessible again later if necessary (e.g. to be able to process returned goods).

A reader may accomplish the above described memory blocking operations by transmitting a command such as a "Lock" command that includes a payload with mask and action bits as described above. The action bits, also called the lock bits, may be used to "lock" specific memory portions.

The locking of memory portions such as user memory portion 952, TID portion 954, EPC portion 956, and reserved memory portion 958 may be accomplished by assigning specific lock bits such as lock bits 972, 974, 976, and 978 to the respective memory portions. When the tag receives a "Lock" command with one or more of the lock bits set to a predetermined value (e.g. "1"), it locks the corresponding memory portion.

RFID tags according to embodiments are not limited to lock bits being assigned to individual memory portions in a one-on-one manner. Rather, a combination of lock bits may also specify a particular memory portion.

Figure 9C:
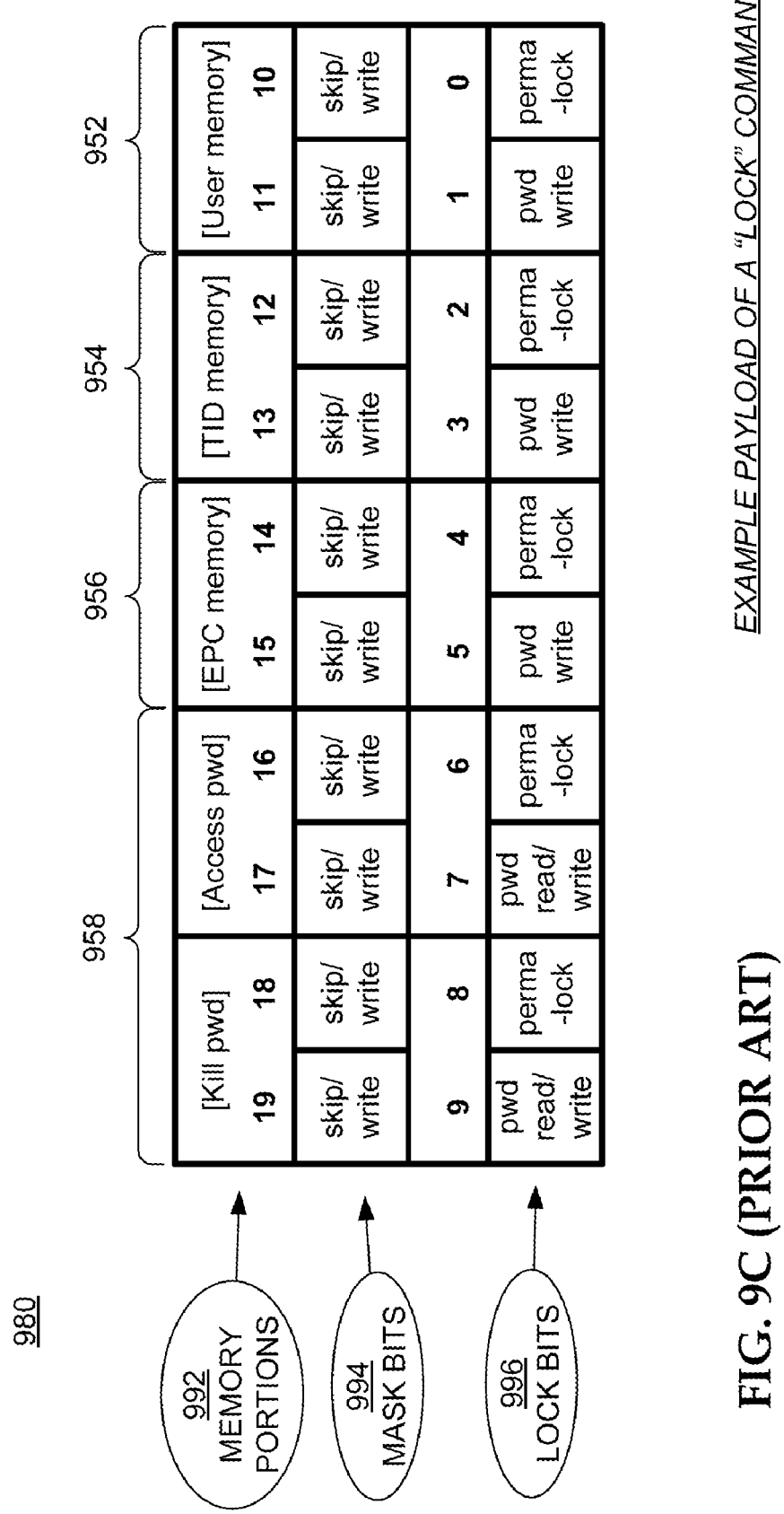
FIG. 9C illustrates an example payload of a "Lock" command that can be applied to control the memory lock bits of the memory of FIG. 9B, also in compliance with the Gen2 Specification.

FIG. 9C illustrates an example payload of a "Lock" command that can be applied to control the memory lock bits of the memory of FIG. 9B, also in compliance with the Gen2 Specification.

A reader according to Gen2 Specification may set 10 lock bits in the tag by issuing a "Lock" command, which includes a 20-bit payload. 10 bits of the payload are mask bits, the other 10 are the lock bits. Diagram 980 illustrates the mask bits (994) and lock bits (996) of a "Lock" command's payload and their associated action fields (e.g. which memory portions 992 the lock bits act on).

According to the Gen2 Specification, a mask bit being set to "0" causes the tag to retain its current lock bit (skip). If a mask bit is set to "1", the tag may overwrite the current lock bit (write) with the value included in the "Lock" command's payload.

As shown in the figure, two lock bits are assigned to user memory portion 952. If the first lock bit (bit 0) is set to a "1" then the user memory portion 952 is permanently locked. If bit 0 is set to a "0" then user memory portion 952 is not permanently locked. User memory portion 952 may be locked or permanently locked in one of a writeable or unwriteable state, the state being determined by the second lock bit (bit 1). Tf bit 1 is set to a "0" then user memory portion 952 is writeable; if bit 1 is set to a "1" then it is not writeable.

The TID portion 954 and the EPC portion 956 are configured to be locked (or unlocked) in a similar manner by using lock bits 2, 3 and 4, 5, respectively, and their corresponding mask bits.

Diagram 980 also shows lock bit pairs (bits 6, 7 and 8, 9) and their corresponding mask bits being used to lock or leave accessible the "Kill" and "Access" passwords 958 stored in the reserved memory portion of the tag memory.

The invention is now explained further. The one or more memory functions that can be disabled can be among those surveyed above.

In some embodiments of the invention the first memory function is disabled permanently. In others, it is reversible. It is often preferred that the disabling become permanent, so that better privacy can be implemented, where, for example, RFID tags are used for consumer goods. In preferred embodiments, the disabling is made permanent by making it so that the first protocol-related bit cannot be reset once it has been set.

Any suitable memory function can be disabled, in different ways. A number of such possible memory functions are described.

In one embodiment, the first memory function includes to disable a later ability to lock the memory portion. For example, if this memory function is disabled, the tag or chip will no longer support block permalocking of the memory portion. Block permalocking is defined in the Gen 2 Specification, and the portion can be the user memory.

In another embodiment, the first memory function includes to read a memory portion. For example, if this memory function is disabled, that portion of the memory can no longer be read. It could be the user memory, or another portion.

In one more embodiment, the first memory function includes a locking function of a memory portion. For example, if this memory function is disabled, that portion of the memory becomes unlocked, and can be changed. This could be applied to all banks of memory that are ordinarily un-lockable. This procedure may further be reversible in some embodiments.

In an additional embodiment, the first memory function includes to write to a memory portion. For example, if this memory function is disabled, that portion of the memory becomes un-writable.

In further embodiments, the first memory function includes combinations of the above individual functions. For example, a memory might be prevented from being read, and from being written to, and so on.

When the first memory function becomes disabled, the tag no longer responds the same way. For example, if it were to receive again the initial command that previously caused it to employ the first memory function, after disabling it will not employ again the first memory function.

The tag will know to not employ the first memory function because it can determine internally that it has been disabled. For example, determining can take place by determining that the protocol-related bit has been set.

In such an instance, a tag may respond in any number of ways, or not at all. In some embodiments, it backscatters a negative reply on occasion of not employing the first memory function.

Moreover, when the first memory function becomes disabled, the tag might again receive the first partial-kill command, which at this point would be redundant. The redundant command might be ignored, or responded to in any fashion. In some embodiments, it might backscatter an other status reply to indicate that the first memory function has been disabled. The other status reply can indicate, or not, whether the first memory function had previously become disabled, or is just becoming disabled. The other status reply can be generated from the set first protocol-related bit, if these are used.

By now it will have been noticed that the preferred embodiments of the invention involve using the protocol-related bits. In addition, more advanced embodiments are possible, for example by using combinations of such bits, either individually or with rules among them, and so on. For understanding these better, it is advantageous to describe at this point how a tag physical memory can be according to embodiments.

Figure 10A:
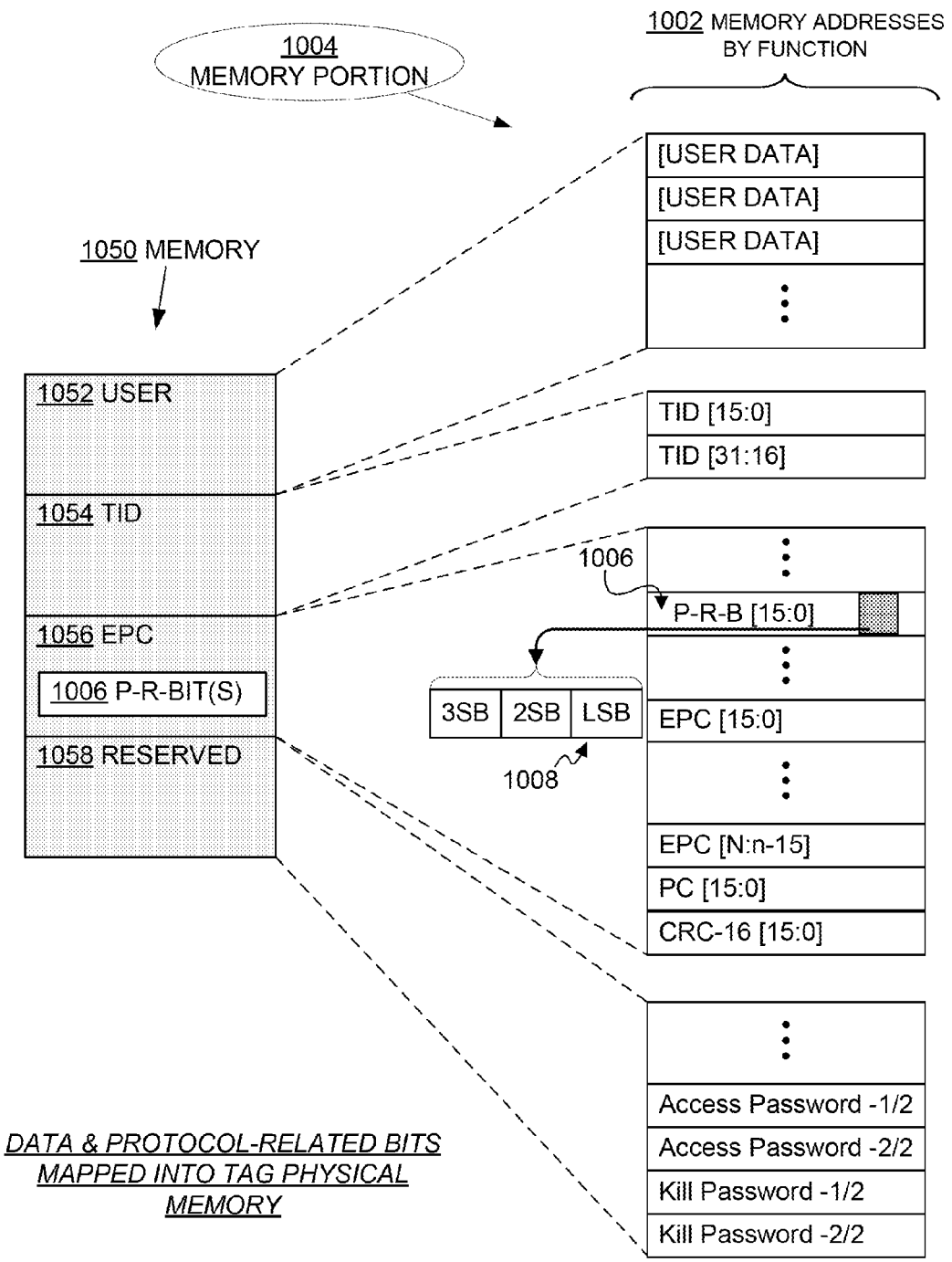
FIG. 10A is a diagram illustrating how tag physical memory can be partitioned and organized for data to be mapped into it, such data including protocol-related bits according to embodiments.

FIG. 10A is a diagram illustrating how a tag physical memory can be partitioned into memory portions 1004 and organized for data to be mapped into it, including the protocol-related bits (P-R-Bits) according to embodiments.

User memory portion 1052, TID memory portion 1054, and reserved memory portion 1058 of tag memory 1050 are configured to operate similarly to the tag memory 950 of FIG. 9A with data stored as discussed above.

Differently from FIG. 9A, a tag memory 1050 according to some embodiments may include an EPC portion 1056 with a location 1006 for the protocol-related bits (P-R-B). While a single location is shown, such P-R-Bits may be stored as one word or as multiple words. In some embodiments, the P-R-Bits are stored as one word whose size is 16 bits.

In preferred embodiments, the disabling bits will be in a payload of a reader command, in the position specified by the Gen 2 Specification for the extended protocol control XPC bits. Such is shown, for example, with a brief reference to FIG. 14, where disabling bits are known as RFU/RECOM bits. Furthermore, these disabling bits are received, parsed, and stored in preferred embodiments as the protocol-related bits that control disabling one or more individual memory functions. These protocol-related bits are then stored in location 1006.

Portion 1002 shows memory addresses by function. Much is similar to the memory addresses 902 of FIG. 9A. In addition, location 1006 is shown with the P-R-Bits.

It is preferred, but not necessary for practicing the invention, that memory location 1006 be able to accommodate more than just one bit. In a number of embodiments, each P-R-Bit nominally corresponds to disabling each individual memory function.

While a partial-kill command may include a single disabling bit, such a bit may disable one or more individual memory functions. This can be accomplished, for example, if there are rules among the bits.

In such embodiments, when the first command is received, a second protocol-related bit is set, in addition to the first such bit. Furthermore, a second memory function is disabled, as per the above, without the tag becoming totally killed.

In some embodiments combinations of memory functions are disabled for a broader effect. For example, when both writing to a memory portion and reading from it are disabled, then the memory portion is effectively itself disabled.

In these embodiments, it is advantageous for the status reply to be generated also from the set second protocol-related bit, to indicate that also the second memory function has been disabled. This can be performed in any number of ways. For example, the status reply can indicate a value of the set first and second protocol-related bit.

In some embodiments, the first memory function includes disabling a later ability to lock the memory portion, and the second memory function includes reading the memory portion. These can be accomplished, therefore, with a single disabling bit.

Moreover, a partial-kill command may include any number of disabling bits. In some embodiments there is a one-to-one correspondence between the disabling bits and the protocol-related bits. FIG. 10A illustrates an example with a one-to-one correspondence between three disabling bits and three protocol-related bits, namely 3SB, 2SB, and LSB. In this example, if a tag receives a reader command whose RFU/RECOM bits are 001, it asserts a "1" in the least significant bit (LSB) location 1008 of its protocol-related bits in tag memory.

Additionally, partial-kill commands may be received serially, with the tag successively disabling functions. For example, the above effect can be accomplished with two separate commands, one for disabling the first memory function, and one for disabling the second.

As described above, in some embodiments the P-R-Bits, once set, may not be unset. Continuing the previous example of a tag with three disabling bits and three protocol-related bits, upon receiving successive partial-kill commands the tag may assert additional disabling bits. For example, the tag may receive a subsequent partial-kill command containing "100" for the RFU/RECOM bits. In this case the tag will assert "1" for the 3SB bit of its XPC, resulting in the tag's stored XPC bits becoming "101".

The tag can use the protocol-related bits as its record of which (if any) of its memory functions have been disabled, as well as providing a record of other details of the partial-kill operation.

Additionally, and as mentioned above with reference to rules among the protocol control bits, some P-R-Bits may have priority over others. For example, an asserted LSB may indicate that the tag no longer supports permalocking of subportions of the user memory portion, whereas an asserted 2SB may indicate that the user memory portion is killed. Here, a 2SB may take precedence over the LSB, meaning that if both are asserted then the user memory portion is killed.

An asserted 3SB may indicate that the tag has unlocked all un-lockable memory portions and/or locations, including those that were previously pennalocked. These memory portions may be locked and/or permalocked by a subsequent "Lock" command.

It will have been observed that many of the memory functions that can be disabled involve accessing the contents of the memory. These can be accomplished with controlling lock bits of the memory portions, as described immediately below. As written above, in a number of embodiments, the memory function is disabled by adjusting a first lock bit. For example, the lock bit is adjusted responsive to setting the associated protocol-related bit.

Figure 10B:
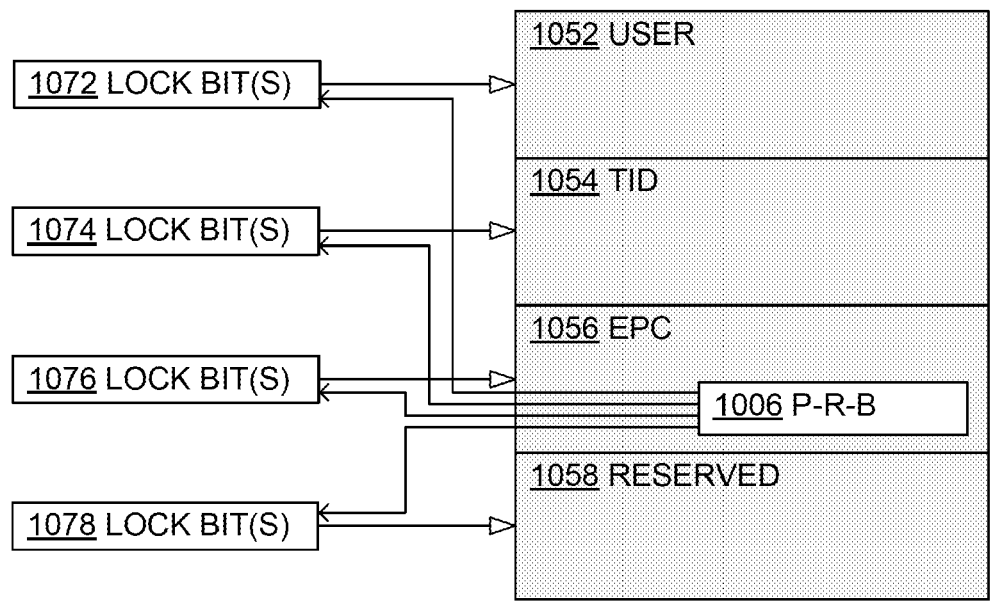
FIG. 10B is a diagram illustrating how lock bits can be used to control access to a memory that is partitioned and organized as the memory of FIG. 10A, and in which further the lock bits are controlled by the protocol-related bits that are mapped within the memory of FIG. 10A.

FIG. 10B is a diagram illustrating how lock bits can be used to control access to a memory that is partitioned and organized as the memory of FIG. 10A, and in which further case the lock bits are altered by protocol-related bits that are mapped within the memory of FIG. 10A.

Diagram 1070 shows a tag memory with portions 1052, 1054, 1056, and 1058 as described previously. In a tag circuit according to embodiments, each memory portion may be assigned one or more lock bits such as lock bits 1072, 1074, 1076, and 1078, respectively.

A distinction is now made: the contents of memory portions 1052, 1054, 1056, 1058 can be backscattered to a reader, and thus a user, if properly accessed and if unlocked. Lock bits 1072, 1074, 1076, and 1078, however, cannot be backscattered under any circumstances. An advantage of the invention is that, by defining location 1006 of the protocol-related bits within portion 1056, the protocol-related bits can themselves be backscattered, and thus the user can ascertain that a tag has indeed been partially killed.

Figure 11:
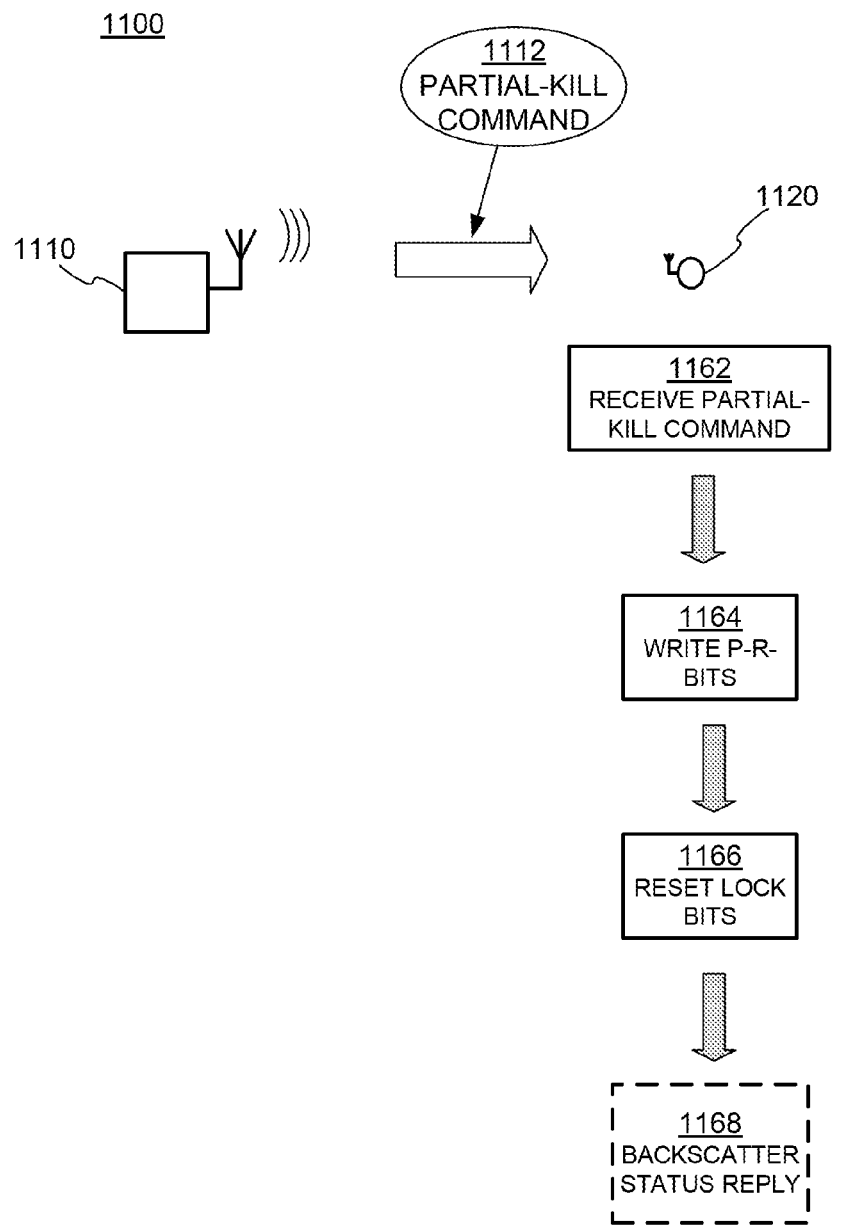
FIG. 11 is a conceptual diagram illustrating how an RFID tag with a memory partitioned and organized as in the memory of FIG. 9 could reset its memory lock bits upon receiving a "Partial Kill" command.

FIG. 11 is a conceptual diagram 1100 illustrating how an RFID tag with a memory partitioned and organized as in the memory of FIG. 10A and FIG. 10B could reset its memory lock bits upon receiving a partial-kill command.

According to diagram 1100, reader 1110 transmits a partial-kill command 1112 to tag 1120. Upon receiving the partial-kill command (1162), the tag may write its protocol-related bits (1164) based on the value of the disabling bits in the partial-kill command's payload.

Then, the tag may reset or adjust its lock bits (1166) based on the (newly) written protocol-related bits. The reset lock bits determine which memory portions are locked or unlocked for access by subsequent Read, Write, Lock, and other commands, so as to implement the commanded disabling.

After resetting the lock bits, the tag may optionally backscatter a status reply (1168) to the reader, acknowledging the disabling or not of the memory function.

Thus, each partially killed state of the tag can corresponds to a received and stored disabling bit (or combination of bits). The following figures illustrate examples of such states and the tag's transition after receiving the disabling bits.

FIG. 12A through FIG. 12D are example tag state diagrams illustrating successive states for a tag according to embodiments to be partially killed, optionally incrementally.

Figure 12A:
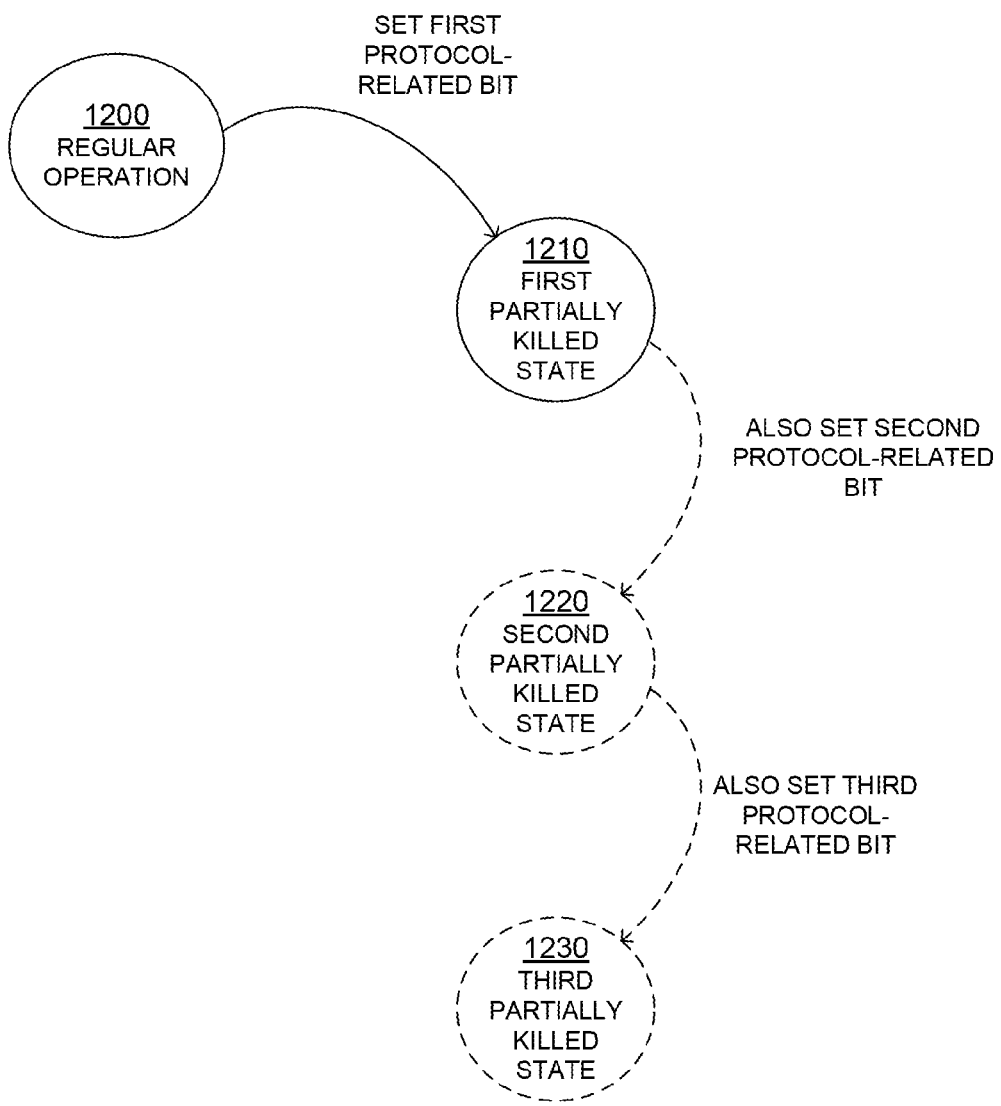
FIG. 12A through FIG. 12D are example tag state diagrams illustrating successive partially killed states for a tag according to embodiments, optionally incrementally.

According to diagram 1201 of FIG. 12A, a tag in regular operation state 1200 receives the first disabling bit, and sets the first protocol-related bit. Then, the tag transitions to a first partially killed state 1210.

Following the first transition, the tag may receive subsequent disabling bits (e.g. second and third) in distinct reader commands and incrementally transition to additional partially killed states such as second partially killed state 1220, then third partially killed state 1230.

A tag's transition to different partially killed states does not have to be in a particular order though. As shown in the following figures, transitioning to a partially killed state based on received disabling bit(s), and determining a tag status and providing a response to a reader based on the same may be accomplished in any order and in any combination.

Figure 12B:
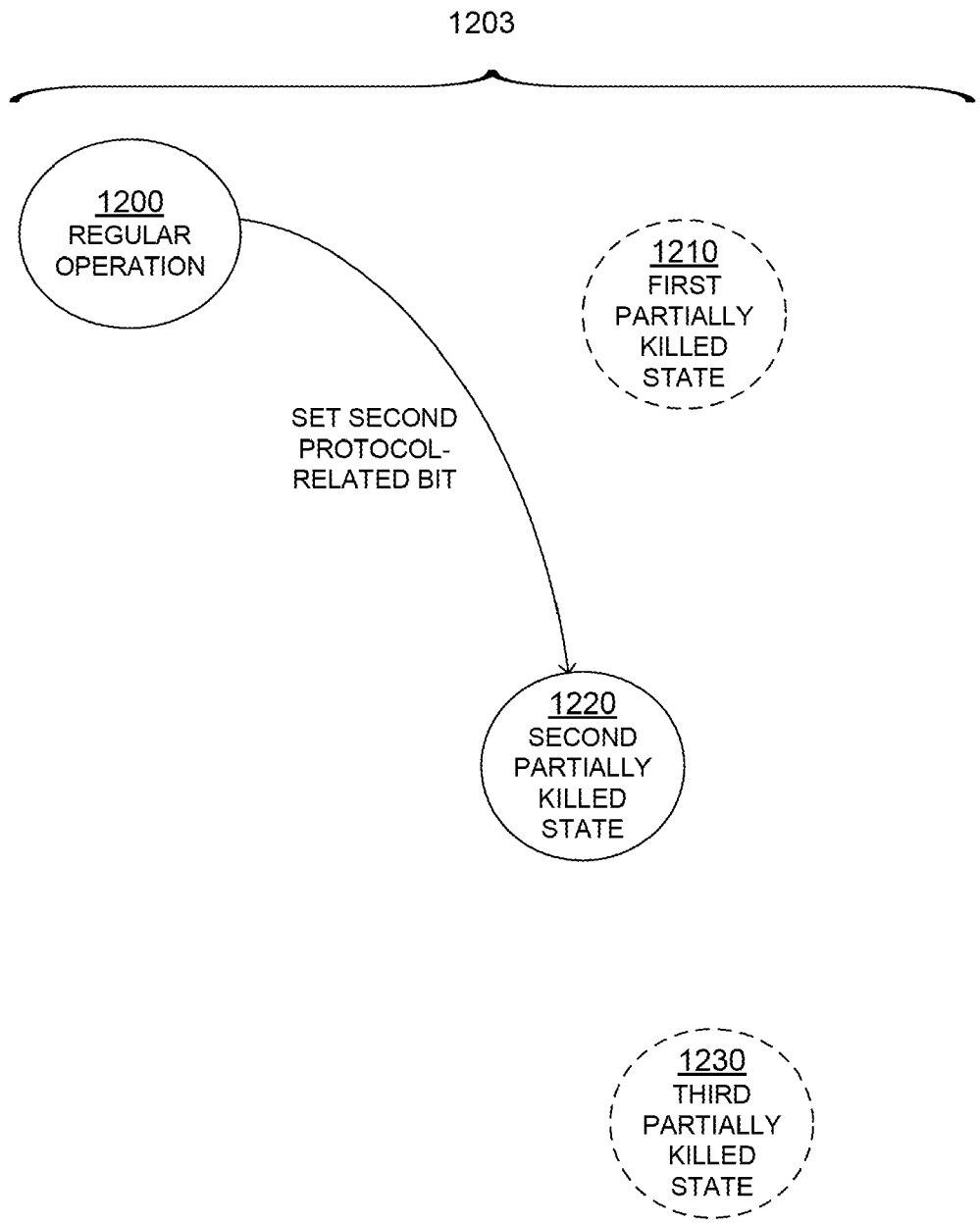

Diagram 1203 of FIG. 12B illustrates another example scenario, where the tag transitions from regular operation state 1200 directly to second partially killed state 1220 upon receiving a second disabling bit.

While the first and third partially killed states are still available, the corresponding disabling bits have not been received, so those states are shown in dashed lines indicating their optional status.

Figure 12C:
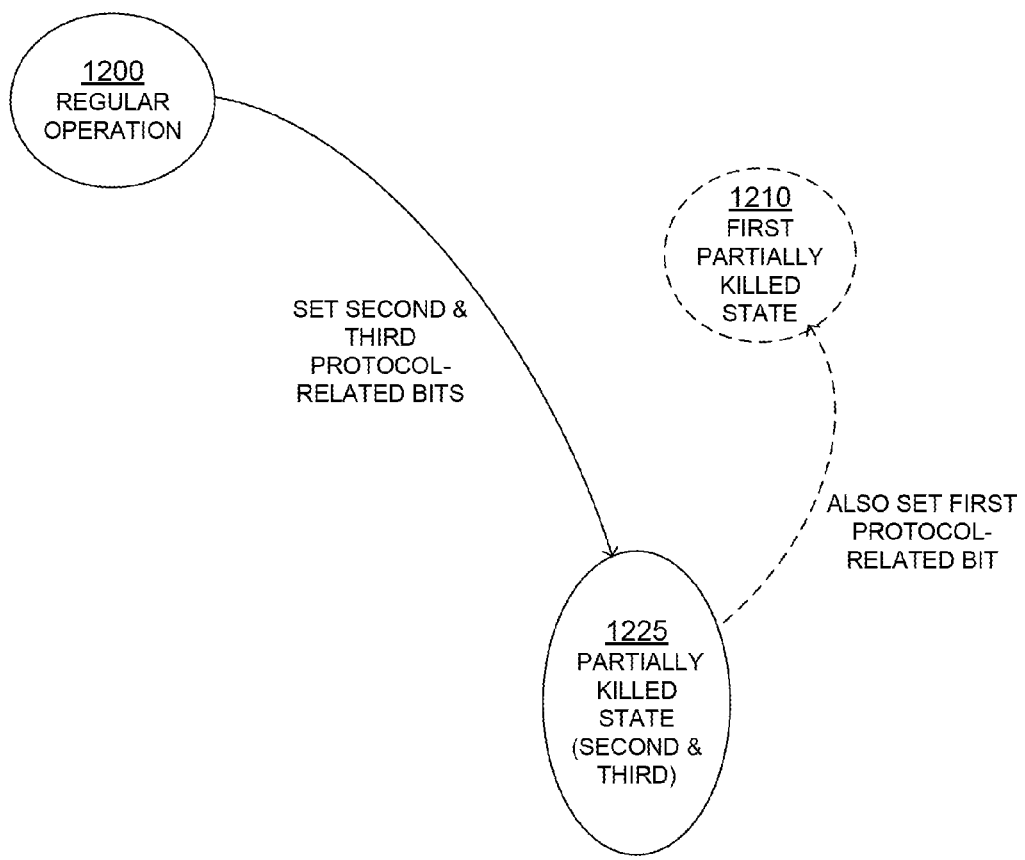

According to diagram 1205 of FIG. 12C, a tag in a regular operation state 1200 receives a partial-kill command that includes two disabling bits instructing the tag to disable two distinct memory functions. The tag transitions to partially killed state 1225, which corresponds to the second and third partially killed states of previous figures.

Subsequently, the tag may receive a further disabling bit in a payload of a partial-kill command. Then it can transition to the corresponding state (first partially killed state 1210), with the first, second, and third protocol-related bits now being set.

While some of these examples relate to transitioning the tag to distinct partially killed states, which are based on received disabling bits and storing protocol-control bits, and determining the tag status based on the same, embodiments of the invention are not so limited.

Figure 12D:
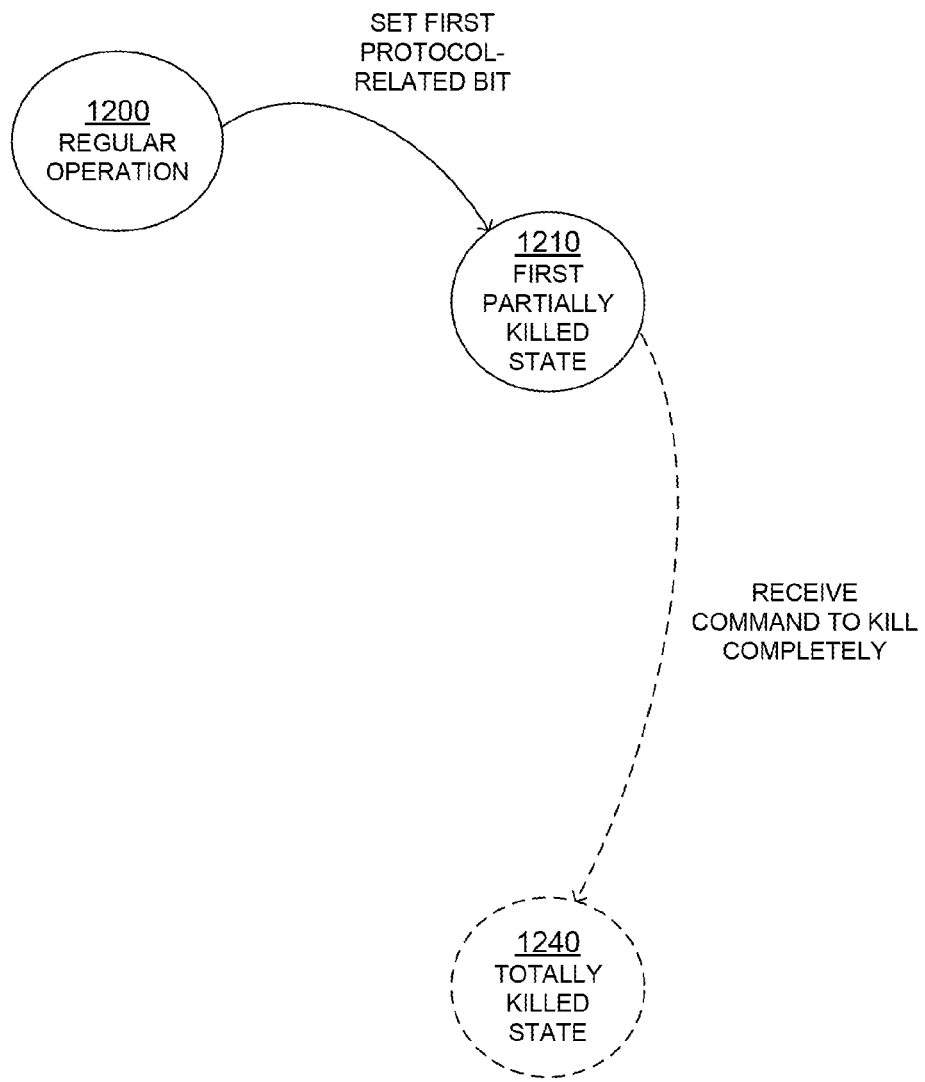

As shown in diagram 1207 of FIG. 12D, a tag may transition from regular operation state 1200 to first partially killed state 1210 upon receiving a first disabling bit. Then, the tag may receive a command that instructs the tag to transition to a totally killed state. This latter command may be a partial-kill command including all remaining disabling bits, a regular kill command, or a different command entirely.

Figure 13:
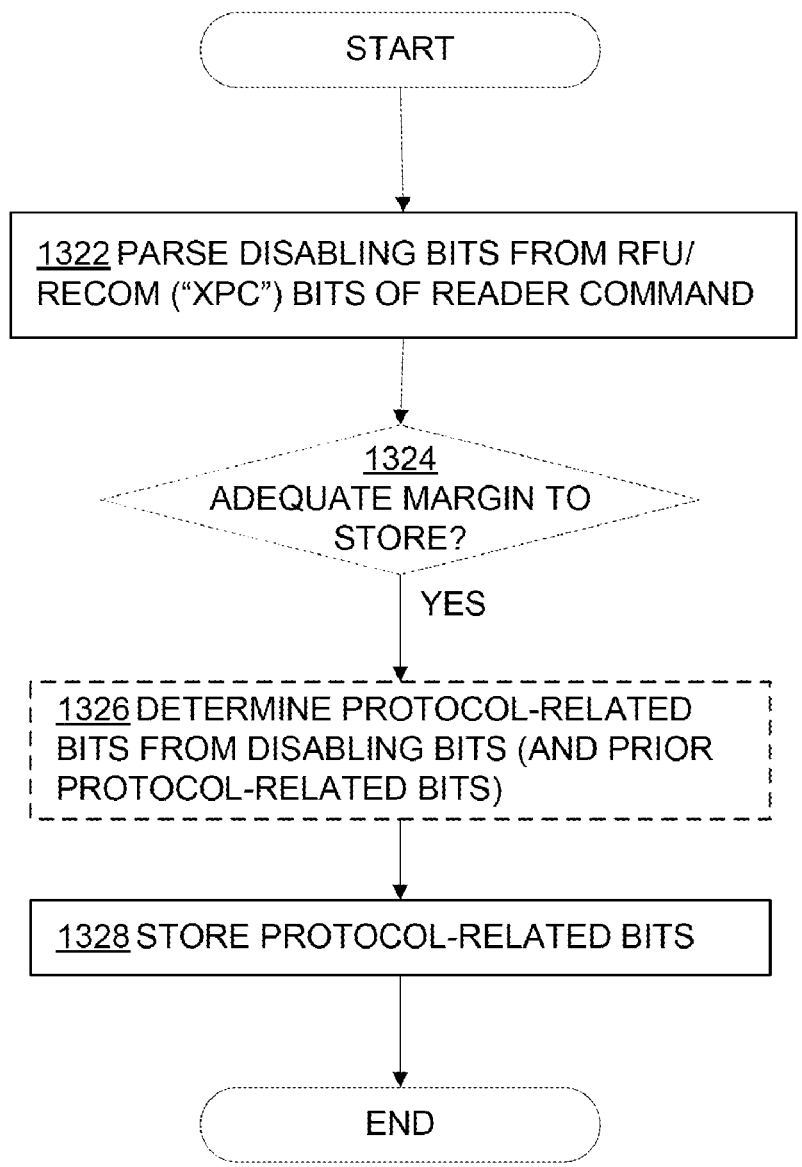
FIG. 13 is a flowchart for implementing an operation of the method of FIG. 7 according to embodiments.

FIG. 13 is a flowchart for implementing an operation of the method of FIG. 7 according to embodiments.

Setting protocol-related bits in a tag based on received disabling bits from a reader may be accomplished in many ways. Process 1320 is one example among many.

According to operation 1322, the tag parses the disabling bits from the RFU/RECOM bits of the received reader command. RFU/RECOM is shorthand for Reserved for Future Use/Recommissioning, and these bits are also in the "XPC" position of the command.

According to a next optional decision operation 1324, a determination is made whether there is adequate storage margin in the tag memory to store reliably the protocol-related bits that will result from the received disabling bits. If there is inadequate margin, the tag may compensate by writing the memory multiple times, or by strengthening its write operation, or by other means.

If the determination is made that there is adequate margin, then according to a next optional operation 1326, new protocol-related bits are determined from the received disabling bits. Preferably the new protocol-related bits are determined also from the previously stored protocol-related bits, as is elsewhere described in this document. In a preferred embodiment, the first protocol-related bit is set by performing a logic OR operation, as described above.

Tags that receive a partial-kill command with newly asserted disabling bits execute those portions of the command that they are capable of executing, responding affirmatively to the reader when done. As described above, in embodiments a partial-kill command does not deassert already-asserted P-R-Bits. For example, if a tag whose P-R-Bits are "100" receives a partial-kill command whose RFU/RECOM bits are "010", and the tag is capable of disabling the memory function corresponding to "010", the tag will do so, and write "110" as its protocol-related bits.

The protocol-related bits may then be stored in memory location 1006 of the tag according to a next operation 1328. If the logic combination is computed prior to operation 1328, the resulting value of the logic combination operation may be stored in memory location 1006 at operation 1328.

The operations included in process 1320 are for illustration purposes only. Setting the protocol-related bits based on received disabling bits for partially killing an RFID tag may be implemented by similar processes with fewer or additional steps, as well as in different order of operations using the principles described herein.

Figure 14:
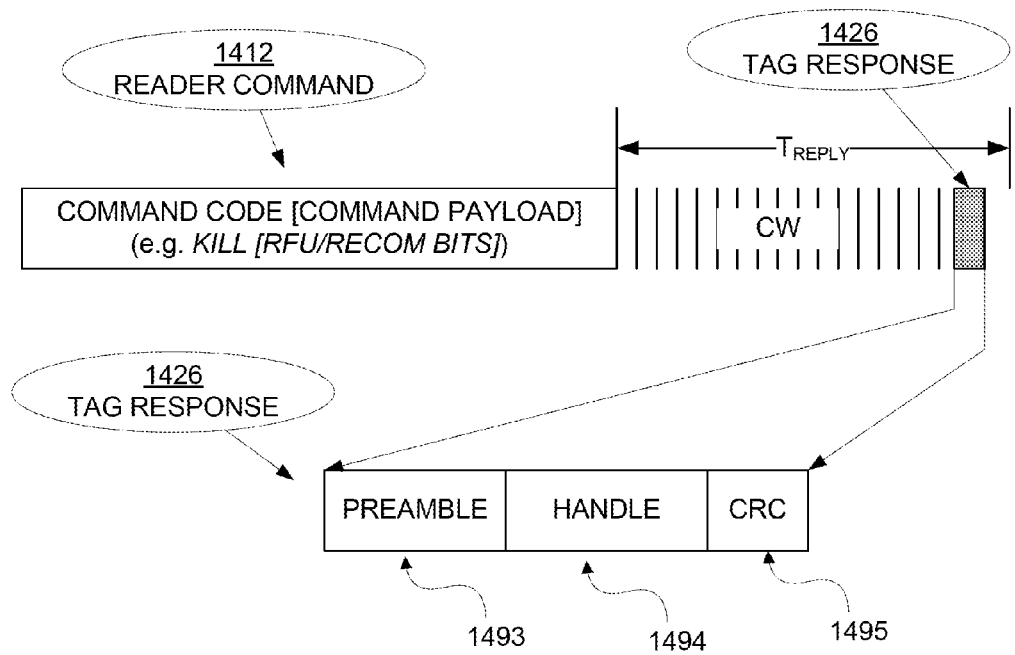
FIG. 14 is a diagram illustrating a reader command with disabling bits as payload and the corresponding tag response, according to embodiments.

FIG. 14 is a diagram illustrating a reader command with disabling bits as payload, and the corresponding tag response, according to embodiments.

A reader command (1412) typically includes a command code and a command payload. For example, a partial-kill command according to embodiments may comprise the command code of a "Kill" command and include within its payload the disabling bits (for example, RFU/RECOM bits).

Once the command is transmitted, the tag is required to respond within a preset time period TREPLY (e.g. 20 ms). The tag response (1426) typically includes a preamble (1493), a handle (1494), and a Cyclical Redundancy Check (CRC) bit or bits (1495).

If the reader is also requesting the tag to report its partial kill status, the response may optionally include the tag's protocol-related bits to affirm to the reader the tag's status.

There is challenge of implementing some, but not all embodiments of the invention. In some embodiments, in response to a partial-kill command, the tag both writes its XPC bits, and resets its lock bits. If resetting is performed by overwriting, then this amounts to two write operations. Two write operations could take more time then a single write operation, e.g. twice as long. The challenge in these embodiments is that the additional time could exceed the preset time period TREPLY of FIG. 14. The challenge can be avoided by practicing embodiments that do not encounter it.

The electrical circuit(s) described in this document can be manufactured in any number of ways, as will be appreciated by the persons skilled in the art. One such way is as integrated circuit(s), as described below.

Schematic-type inputs can be provided for the purpose of preparing one or more layouts. These inputs can include as little as a schematic of a circuit, to more including relative sizes of circuit components and the like, as will be appreciated by a person skilled in the art for such inputs. These inputs can be provided in any suitable way, such as merely in writing, or electronically, as computer files and the like. Some of these computer files can be prepared with the assistance of suitable design tools, often provided as computer software. Such tools often include instrumentalities for simulating circuit behaviors and the like.

These inputs can be provided to a person skilled in the art of preparing layouts. This, whether the person is within the same company, or another company, such as under a contract.

A layout can be prepared that embodies the provided schematic-type inputs by the person skilled in the art. The layout is itself preferably prepared as a computer file. It may be additionally checked for errors, modified as needed, and so on.

In the above, computer files can be made from portions of computer files. For example, suitable individual designs can be assembled for the electrical components and circuits indicated in the schematic-type inputs. The individual designs can be generated anew, or selected from existing libraries for such items. In the layout phase, the assembled designs can be arranged to interoperate, so as to implement as integrated circuit(s) the electrical circuit(s) of the provided schematic-type inputs. These computer files can be stored in storage media, such as memories, whether portable or not, and the like.

Then a special type of computer file can be synthesized from the prepared layout, in a manner that incorporates the prepared layout that has the embodied schematic-type inputs. Such files are known in the industry as IC chip design files or tapeout files, and express instructions for machinery as to how to process a semiconductor wafer, so as to generate an integrated circuit that is arranged as in the incorporated layout. These IC chip design files or tapeout files can be stored on an article such as a memory device.

The synthesized tapeout file is then transferred to a semiconductor manufacturing plant, which is also known as a foundry, and so on. Transferring can be by any suitable means, such as over an electronic network. Or, a tapeout file can be recorded in a storage medium, which in turn is physically shipped to the mask manufacturer.

The received tapeout file is then used by mask making machinery as instructions for processing a semiconductor wafer. The wafer, as thus processed, now has one or more integrated circuits, each made according to the layout incorporated in the tapeout file. If more than one, then the wafer can be diced to separate them, and so on.

In this description, numerous details have been set forth in order to provide a thorough understanding. In other instances, well-known features have not been described in detail in order to not obscure unnecessarily the description.

A person skilled in the art will be able to practice the embodiments in view of this description, which is to be taken as a whole. The specific embodiments as disclosed and illustrated herein are not to be considered in a limiting sense. Indeed, it should be readily apparent to those skilled in the art that what is described herein may be modified in numerous ways. Such ways can include equivalents to what is described herein.

The following claims define certain combinations and sub-combinations of elements, features, steps, and/or functions, which are regarded as novel and non-obvious. Additional claims for other combinations and sub-combinations may be presented in this or a related document.

What is claimed is:

1. An RFID tag comprising a memory, the tag configured to at least:
receive an initial command;
respond to the initial command by employing a first memory function associated with at least a portion of the memory;
receive a first command;
set a first protocol-related bit in the memory in response to the first command;
disable the first memory function in response to receiving the first command, the tag still being able backscatter an operating reply in response to an operating request received thereafter;
backscatter a status reply generated also from the set first protocol-related bit to indicate that the first memory function has been disabled;
receive an interim command;
respond to the interim command by employing a second memory function associated with at least a second portion of the memory;
set a second protocol-related bit in response to the first command;
disable also the second memory function in response to receiving the first command, the tag still being able backscatter the operating reply in response to an operating request received thereafter; and
in which the status reply is generated also from the set second protocol-related bit to indicate that also the second memory function has been disabled.

2. The RFID tag of claim 1, in which
the first command includes a command payload that has a first disabling bit, and
the first memory function is disabled in response to receiving the first disabling bit.

3. The RFID tag of claim 2, in which
the first protocol-related bit is set responsive to the first disabling bit.

4. The RFID tag of claim 3, in which
the first protocol-related bit is set responsive also to a previous value for the first protocol-related bit.

5. The RFID tag of claim 3, in which
the first protocol-related bit is set by performing a logic OR operation between a value of a previously stored corresponding protocol-related bit and a value of a received disabling bit.

6. The RFID tag of claim 2, in which
the status reply indicates a value of the first disabling bit and a value of the set first protocol-related bit.

7. The RFID tag of claim 1, in which
the operating request requests a random number, and
the operating reply includes a random number.

8. The RFID tag of claim 1, in which the status reply is backscattered in response to receiving the first command.

9. The RFID tag of claim 1, further configured to:
receive a subsequent command by a reader, and
in which the status reply is backscattered in response to subsequent command.

10. The RFID tag of claim 1, in which
the first protocol-related bit cannot be reset once it has been set.

11. The RFID tag of claim 1, in which
the first memory function includes at least one from a set of: disabling a later ability to lock the memory portion, reading the memory portion, a locking function of the memory portion, and writing to the memory portion.

12. The RFID tag of claim 1, further configured to:
receive again the initial command after disabling the first memory function;
not employ the first memory function in response to receiving again the initial command and
in which not employing is performed responsive to determining that the protocol-related bit has been set.

13. The RFID tag of claim 1, further configured to:
receive again the first command; and
backscatter an other status reply generated from the set first protocol-related bit to indicate that the first memory function has been disabled.

14. A method for an RFID tag having a memory, comprising:
receiving an initial command;
responding to the initial command by employing a first memory function associated with at least a portion of the memory;
receiving a first command;
setting a first protocol-related bit in the memory in response to the first command;
disabling the first memory function in response to receiving the first command, the tag still being able backscatter an operating reply in response to an operating request received thereafter;
backscattering a status reply generated also from the set first protocol-related bit to indicate that the first memory function has been disabled;
receiving an interim command;
responding to the interim command by employing a second memory function associated with at least a second portion of the memory;
setting a second protocol-related bit in response to the first command;
disabling also the second memory function in response to receiving the first command, the tag still being able backscatter the operating reply in response to an operating request received thereafter; and
in which the status reply is generated also from the set second protocol-related bit to indicate that also the second memory function has been disabled.

15. An RFID tag comprising a memory and a processor, the processor configured to at least:
receive an initial command;
respond to the initial command by employing a first memory function associated with at least a portion of the memory;
receive a first command;
set a first protocol-related bit in the memory in response to the first command;
disable the first memory function in response to receiving the first command, the tag still being able backscatter an operating reply in response to an operating request received thereafter;
backscatter a status reply generated also from the set first protocol-related bit to indicate that the first memory function has been disabled;
receive an interim command;
respond to the interim command by employing a second memory function associated with at least a second portion of the memory;
receive a second command;
set a second protocol-related bit in response to the second command;
disable the second memory function in response to receiving the second command, the tag still being able backscatter the operating reply in response to an operating request received thereafter; and backscatter a second status reply generated also from the set second protocol-related bit to indicate that the second memory function has been disabled.

16. The RFID tag of claim 15, in which
the first command includes a command payload that has a first disabling bit, and
the first memory function is disabled in response to receiving the first disabling bit.

17. The RFID tag of claim 16, in which
the first protocol-related bit is set responsive to the first disabling bit.

18. The RFID tag of claim 17, in which
the first protocol-related bit is set responsive also to a previous value for the first protocol-related bit.

19. The RFID tag of claim 17, in which
the first protocol-related bit is set by performing a logic OR operation between a value of a previously stored corresponding protocol-related bit and a value of a received disabling bit.

20. The RFID Tag of claim 16, in which
the status reply indicates a value of the disabling bit and a value of the set first protocol-related bit.

21. The RFID tag of claim 15, in which
the status reply is backscattered in response to receiving the first command.

22. The RFID tag of claim 15, wherein the processor is further configured to:
receive a subsequent command by a reader, and
in which the status reply is backscattered in response to subsequent command.

23. The RFID tag of claim 15, in which
the first protocol-related bit cannot be reset once it has been set.

24. The RFID tag of claim 15, in which
the first memory function includes at least one from a set of: disabling a later ability to lock the memory portion, reading the memory portion, a locking function of the memory portion, and writing to the memory portion.

25. The RFID tag of claim 15, wherein the processor is further configured to:
receive again the initial command after disabling the first memory function;
not employ the first memory function in response to receiving again the initial command; and
in which not employing is performed responsive to determining that the protocol-related bit has been set.

26. The RFID tag of claim 15, wherein the processor is further configured to:
receive again the first command; and
backscatter an other status reply generated from the set first protocol-related bit to indicate that the first memory function has been disabled.

27. A method for an RFID tag having a memory and a processor, the method comprising:
receiving an initial command;
responding to the initial command by employing a first memory function associated with at least a portion of the memory;
receiving a first command;
setting a first protocol-related bit in the memory in response to the first command;
disabling the first memory function in response to receiving the first command, the tag still being able backscatter an operating reply in response to an operating request received thereafter;

backscattering a status reply generated also from the set first protocol-related bit to indicate that the first memory function has been disabled;
receiving an interim command;
responding to the interim command by employing a second memory function associated with at least a second portion of the memory;
receiving a second command;
setting a second protocol-related bit in response to the second command;
disabling the second memory function in response to receiving the second command, the tag still being able backscatter the operating reply in response to an operating request received thereafter; and
backscattering a second status reply generated also from the set second protocol-related bit to indicate that the second memory function has been disabled.

28. The method of claim 27, in which
the first command includes a command payload that has a first disabling bit, and
the first memory function is disabled in response to receiving the first disabling bit.

29. The method of claim 28, in which
the first protocol-related bit is set responsive to the first disabling bit.

30. The method of claim 29, in which
the first protocol-related bit is set responsive also to a previous value for the first protocol-related bit.

31. The method of claim 27, in which
the status reply is backscattered in response to receiving the first command.

32. The method of claim 27, in which
the first protocol-related bit cannot be reset once it has been set.

33. The method of claim 27, in which
the first memory function includes at least one from a set of: disabling a later ability to lock the memory portion, reading the memory portion, a locking function of the memory portion, and writing to the memory portion.

34. The method of claim 27, further comprising:
receiving again the initial command after disabling the first memory function;
not employing the first memory function in response to receiving again the initial command; and
in which not employing is performed responsive to determining that the protocol-related bit has been set.

35. The method of claim 27, further comprising:
receiving again the first command; and
backscattering an other status reply generated from the set first protocol-related bit to indicate that the first memory function has been disabled.

36. The method of claim 14, in which
the first command includes a command payload that has a first disabling bit, and
the first memory function is disabled in response to receiving the first disabling bit.

37. The method of claim 36, in which
the first protocol-related bit is set responsive to the first disabling bit.

38. The method of claim 37, in which
the first protocol-related bit is set responsive also to a previous value for the first protocol-related bit.

39. The method of claim 14, in which
the status reply is backscattered in response to receiving the first command.

40. The method of claim 14, in which
the first protocol-related bit cannot be reset once it has been set.
41. The method of claim 14, in which
the first memory function includes at least one from a set of: disabling a later ability to lock the memory portion, reading the memory portion, a locking function of the memory portion, and writing to the memory portion.
42. The method of claim 14, further comprising:
receiving again the initial command after disabling the first memory function;
not employing the first memory function in response to receiving again the initial command; and
in which not employing is performed responsive to determining that the protocol-related bit has been set.
43. The method of claim 14, further comprising:
receiving again the first command; and
backscattering an other status reply generated from the set first protocol-related bit to indicate that the first memory function has been disabled.

* * * * *

UNITED STATES PATENT AND TRADEMARK OFFICE
CERTIFICATE OF CORRECTION

| | | |
|---|---|---|
| PATENT NO. | : 8,044,774 B1 | Page 1 of 1 |
| APPLICATION NO. | : 11/852439 | |
| DATED | : October 25, 2011 | |
| INVENTOR(S) | : Diorio et al. | |

It is certified that error appears in the above-identified patent and that said Letters Patent is hereby corrected as shown below:

1) Please delete "Verson" (First Page Col. 2 (other publications), line 3) and insert -- Version --, therefor.

2) Please delete "is it" (column 1, line 63) and insert -- it is --, therefor.

3) After "444." (column 6, lines 9-14) please delete "Circuit 430 additionally includes a memory 450, which stores information. Memory 450 is preferably implemented as a Nonvolatile Memory (NVM), which means that its stored information is retained even when circuit 430 does not have power, as is frequently the case for a passive RFID tag." and insert the same on Col. 6, Line 10 as a new Paragraph.

4) Please delete "Tf" (column 10, line 50) and insert -- If --, therefor.

5) Please delete "pennalocked." (column 13, line 22) and insert -- permalocked. --, therefor.

6) In Claim 20 (column 19, line 22), please delete "Tag" and insert -- tag --, therefor.

Signed and Sealed this
Sixth Day of March, 2012

David J. Kappos
*Director of the United States Patent and Trademark Office*